(12) United States Patent
Takeshita et al.

(10) Patent No.: US 7,362,961 B2
(45) Date of Patent: Apr. 22, 2008

(54) RECORDING APPARATUS INCLUDING PLURAL STORAGE MEANS HAVING STANDBY MODES

(75) Inventors: Shigeru Takeshita, Kanagawa-ken (JP); Makoto Kondo, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1102 days.

(21) Appl. No.: 10/665,409

(22) Filed: Sep. 22, 2003

(65) Prior Publication Data

US 2004/0120690 A1    Jun. 24, 2004

Related U.S. Application Data

(63) Continuation of application No. 08/171,978, filed on Dec. 23, 1993, now abandoned, which is a continuation of application No. 07/788,312, filed on Nov. 5, 1991, now abandoned.

(30) Foreign Application Priority Data

| Nov. 7, 1990 | (JP) | ................................. 2-299882 |
| Aug. 27, 1991 | (JP) | ................................. 3-215613 |
| Aug. 27, 1991 | (JP) | ................................. 3-215614 |

(51) Int. Cl.
*H04N 5/00* (2006.01)
(52) U.S. Cl. .................... 386/117; 386/386; 386/125
(58) Field of Classification Search ............... 386/46, 386/112, 107, 117, 125
See application file for complete search history.

(56) References Cited

U.S. PATENT DOCUMENTS

| 3,811,090 A | 5/1974 | Uchida et al. .............. 348/730 |
| 4,456,931 A | 6/1984 | Toyoda et al. .............. 358/335 |
| 4,768,110 A | 8/1988 | Dunlap et al. ............. 360/33.1 |
| 4,928,137 A | 5/1990 | Kinoshita .................... 355/906 |
| 4,945,424 A | 7/1990 | Hiroki et al. ............... 358/906 |
| 5,016,107 A | 5/1991 | Sasson et al. ............... 358/906 |
| 5,016,124 A | 5/1991 | Fukushima et al. ......... 358/906 |
| 5,053,861 A | 10/1991 | Tsai et al. .................... 348/231 |
| 5,057,925 A | 10/1991 | Tsutsui et al. .............. 348/906 |
| 5,067,029 A | 11/1991 | Takahashi et al. .......... 358/335 |
| 5,099,364 A | 3/1992 | Kawabata .................... 358/906 |
| 5,134,487 A | 7/1992 | Taguchi et al. ............. 358/906 |
| 5,153,730 A | 10/1992 | Nagasaki et al. ........... 358/909 |
| 5,170,262 A | 12/1992 | Kinoshita et al. ........... 358/335 |
| 5,200,863 A | 4/1993 | Orii .......................... 360/35.1 |
| 5,309,247 A | 5/1994 | Knoshita et al. .......... 358/909.1 |
| 5,764,848 A | 6/1998 | Suga et al. ................. 358/906 |

FOREIGN PATENT DOCUMENTS

| EP | 336317 | 10/1989 |
| EP | 356351 | 2/1990 |
| JP | 59-64975 | 4/1984 |
| JP | 64-16081 | 1/1989 |
| JP | 01-101079 | 4/1989 |
| JP | 01-109882 | 4/1989 |

*Primary Examiner*—Huy T. Nguyen
(74) *Attorney, Agent, or Firm*—Fitzpatrick, Cella, Harper & Scinto

(57) ABSTRACT

A recording apparatus for recording input information via a memory and a head onto a disc rotated by a disc driver, including a mode switch which successively provides a first mode direction for waiting for the recording and a second mode direction for performing the recording. A control circuit controls the apparatus in such a manner as to place only the memory in a wait state in accordance with the first mode direction, and then stores said input information into the memory in accordance with the second mode direction, at the same time or afterwards, starts the disc driver means.

12 Claims, 20 Drawing Sheets

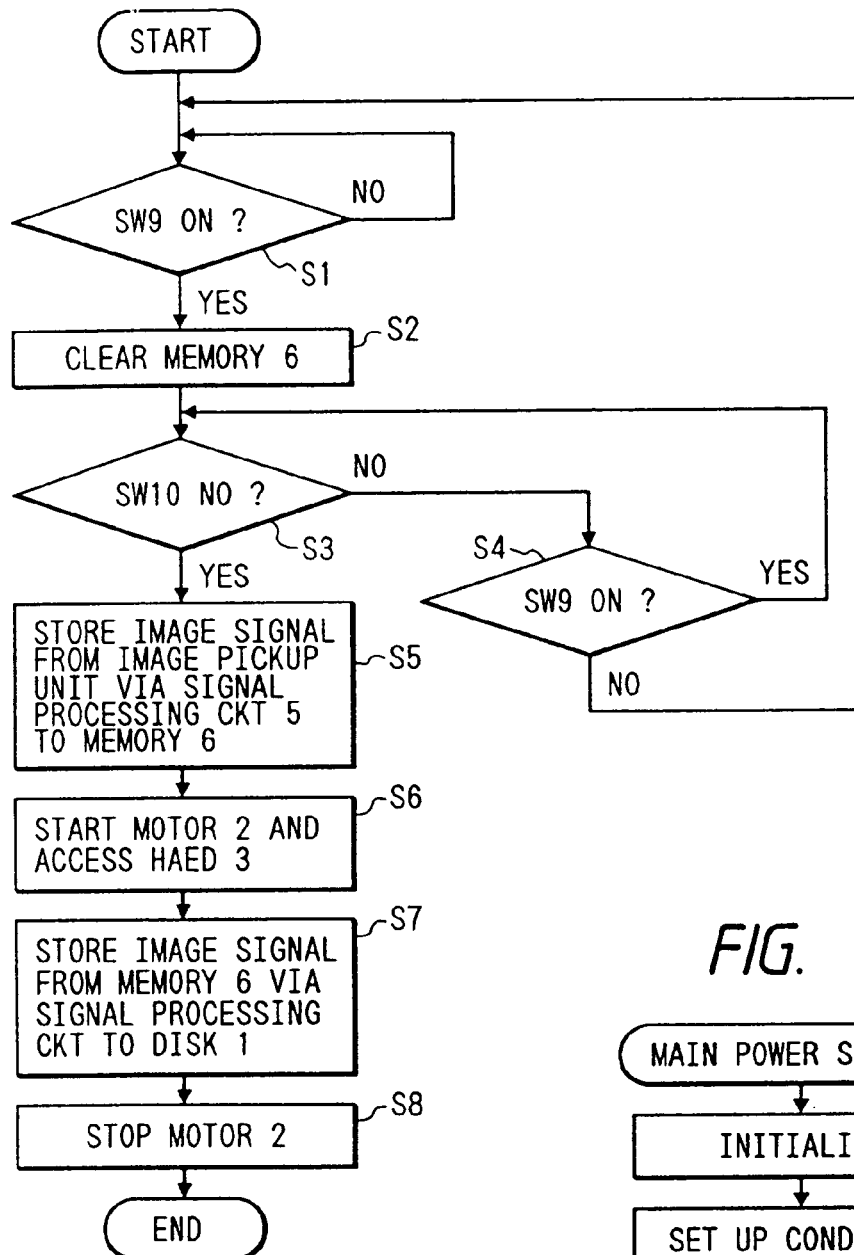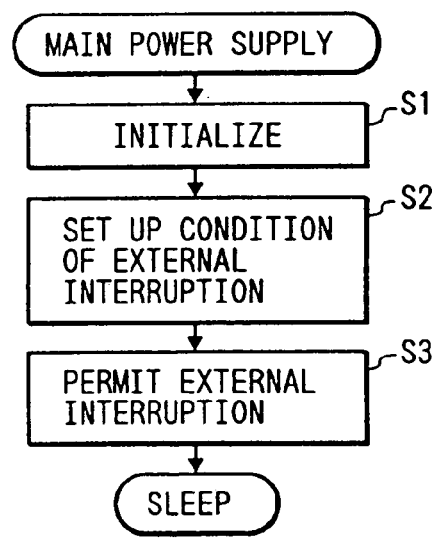

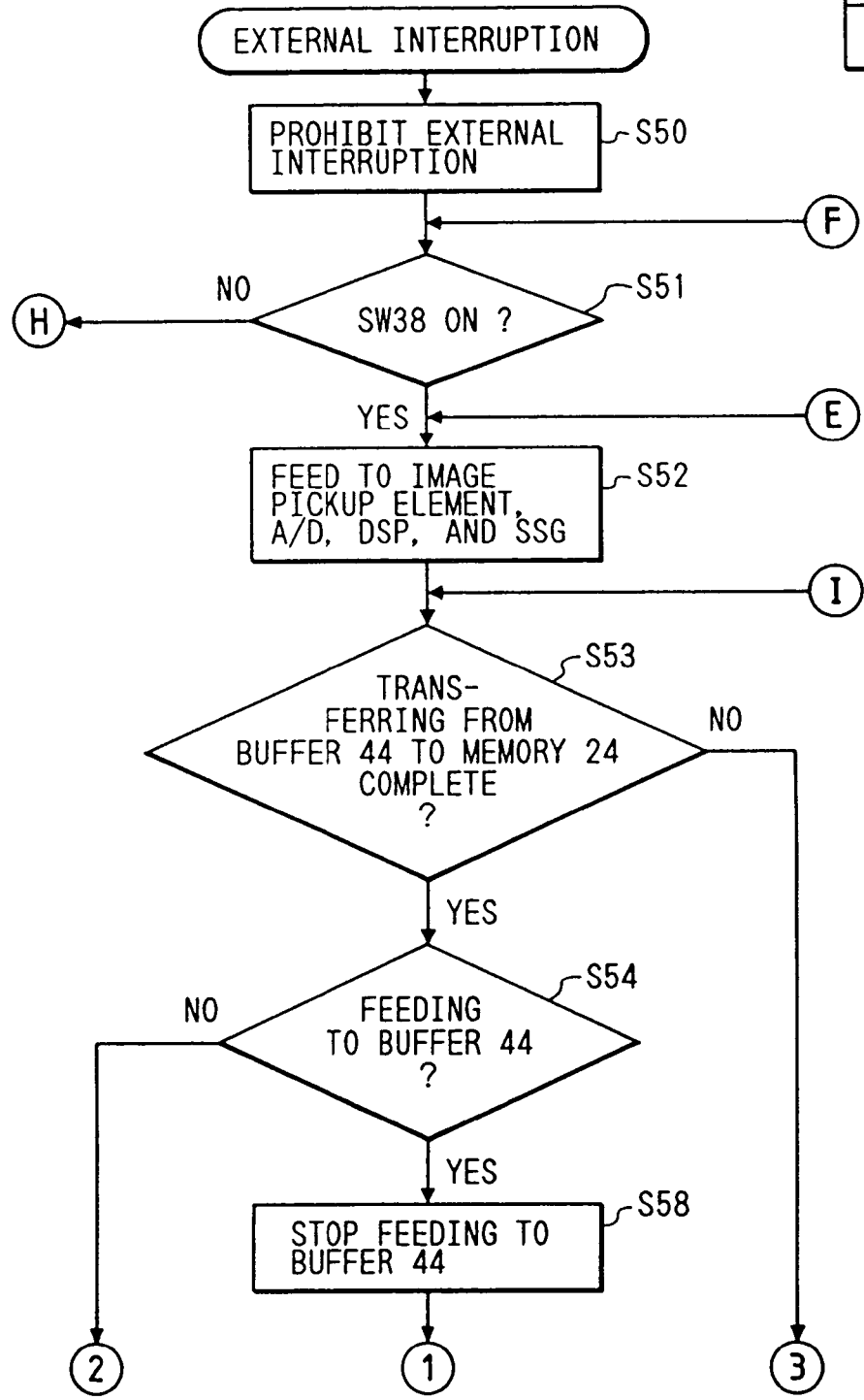

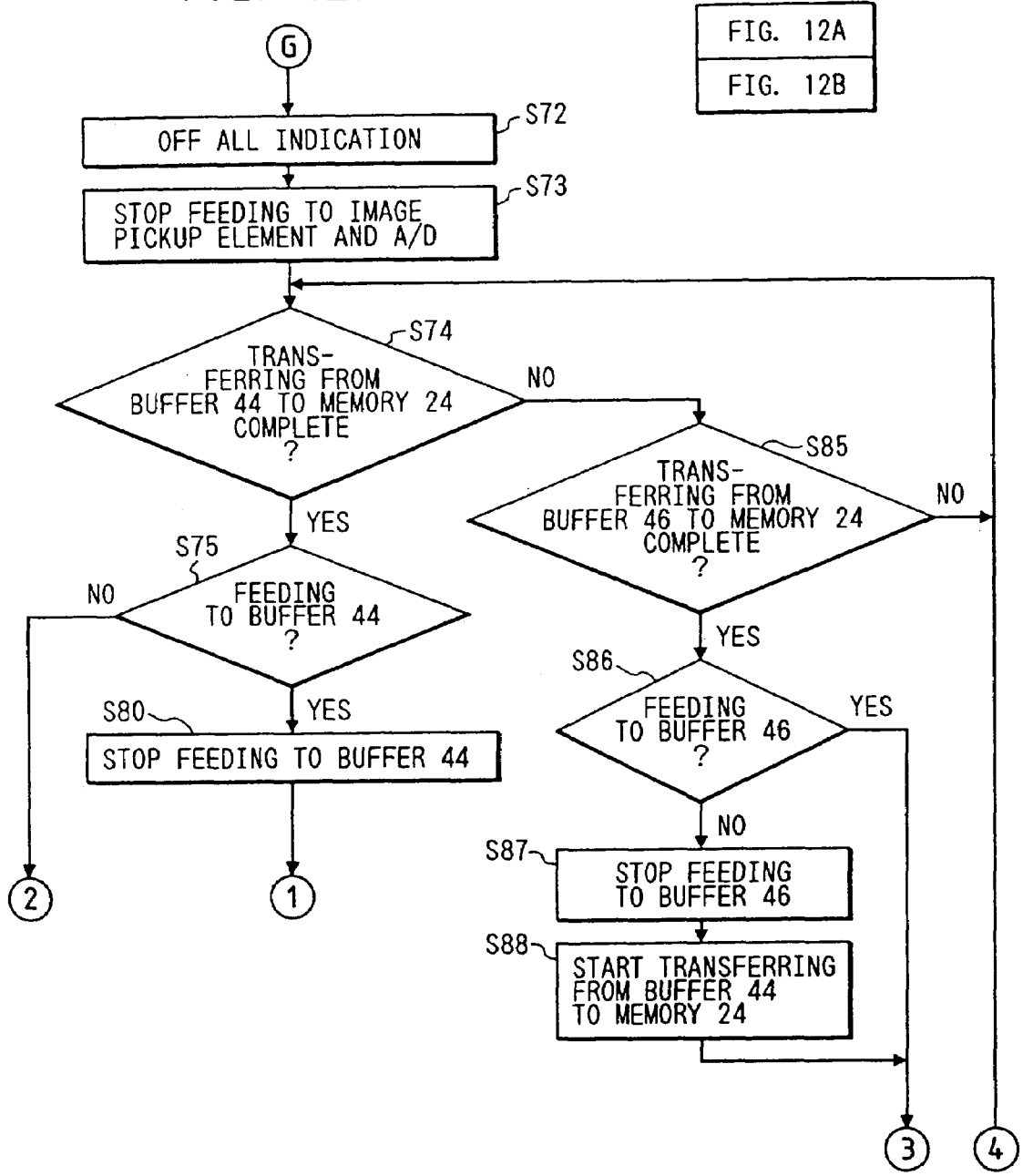

RECORDING APPARATUS INCLUDING PLURAL STORAGE MEANS HAVING STANDBY MODES

This application is a continuation of application Ser. No. 08/171,978, filed Dec. 23, 1993, now abandoned which is a continuation of application Ser. No. 07/788,312, filed Nov. 5, 1991, which is now abandoned.

BACKGROUND OF THE INVENTION

1. Field of the Invention

The present invention relates to a recording apparatus for recording image information.

2. Related Background Art

Conventionally, a recording apparatus of this kind has been well known in which it comprises disc driving means having a motor and a memory, which disc driving means is started in a recording wait (stand-by) mode, thus waiting for the recording.

However, with such a conventional example, as the electric current is consumed more than necessary by the disc driving means even during the waiting for recording, there was a problem to be resolved in connection with the recording apparatus driven by a battery (cell) such as an electronic still camera (SV camera), that the exhaustion of battery is severe, and the internal temperature of the apparatus is raised with the heat due to the current consumed.

Also, with a conventional electronic still camera, it has been proposed that a picked up image is once recorded onto an intermediate recording apparatus (image memory or buffer memory), before it is recorded onto a magnetic disc or semiconductor memory (memory card) which is an ultimate recording medium.

For example, upon a first stroke of the release operation, the power is supplied to an image pickup element and a buffer memory for signal processing, and the magnetic disc which is an ultimate recording medium is started, and upon a second stroke of the release operation (and stabilization of rotation of the magnetic disc), an image picked up by the image pickup element is recorded via the buffer memory into the magnetic disc.

There was disclosed a constitution in Japanese Patent Application Laid-Open No. 64-16081 in which a picked up image is temporarily stored in the intermediate storage devise (frame memory), the magnetic disc is started at an appropriate later stage, and the image stored in the intermediate storage device is transferred and recorded to the magnetic disc. This constitution has an advantage that the consumption power at the peak can be reduced because whether or not the image is recorded onto the magnetic disc can be selected after picking up the image, and the set up speed of rotation of the magnetic disc can be relatively made slower.

Moreover, there was also disclosed a constitution in Japanese Patent Application Laid-Open No. 1-101079 in which an image stored in the intermediate recording medium can be output to the monitor, and a judgment can be made by observing on the monitor screen whether or not the image is recorded onto an ultimate recording medium. With this constitution, the magnetic disc is started in accordance with an instruction from the user that the image recorded in the intermediate recording medium is recorded onto the magnetic disc which is an ultimate recording medium. Thereby, the power consumption due to the start and rotation of the magnetic disc can be reduced.

With the first conventional example as above described, there is a drawback in the case of battery drive that the load of battery is large and the life of battery is short, because a large amount of electric power is consumed at a time with the concurrent feed to the buffer memory and the drive system for the magnetic disc.

With the second and third conventional examples, the power consumption at the peak in photographing can be reduced, but not sufficiently. Also, with the third conventional, example, the user's operation is necessary to transfer an image from the intermediate storage medium to the ultimate recording medium, so that the operativity in continuous photographing is lowered.

As is the case with a silver salt film camera, when the magnetic disc or semiconductor memory (memory card) which is an ultimate recording medium is not loaded, or has no empty area even if it may be loaded, a caution or notice with an indication is displayed to prompt the user to load or exchange the magnetic disc.

The shutter chance may occur before exchange of the magnetic disc.

SUMMARY OF THE INVENTION

It is an object of the present invention to provide a recording apparatus which can resolve the above-mentioned problems totally or separately.

Also, it is another object of the present invention to provide a recording apparatus having a higher power-saving effect as compared with a conventional apparatus.

Also, it is another object of the present invention to provide an image recording apparatus with the improvement of the operativity at the continuous recording.

To accomplish the above objects, in one example according to the present invention, there is disclosed a recording apparatus comprising image pickup means for converting an object image into an electric signal, temporary storage means for temporarily storing the information of picked up image by the image pickup means, recording means for recording and holding the image information read out from the temporary storage means, trigger generating means for generating a record trigger signal, power supply means for supplying a necessary power to the image pickup means, the temporary storage means and the recording means, and control means for controlling the image pickup means, the temporary storage means, the recording means and the power supply means in such a way as to feed the power to the image pickup means and the temporary storage means in accordance with a trigger signal from the trigger generating means, writing temporarily the image information to be recorded into the temporary storage means, feeding the power to the recording means, after the start of writing into the temporary storage means, to thereby transfer the image information from the temporary storage means to the recording means.

Also, it is another object of the present invention to provide a recording apparatus capable of coping with the event where the ultimate recording medium is not mounted or has no empty area.

Other objects and features of the present invention will be apparent by way of the following examples and from the description of the drawings.

BRIEF DESCRIPTION OF THE DRAWINGS

FIG. 3 is a flowchart showing one example of an operation procedure for the apparatus in the example of FIG. 2.

FIG. 5 is a flowchart of a routine in turning on the power in the example of FIG. 4.

DETAILED DESCRIPTION OF THE PREFERRED EMBODIMENTS

The examples of the present invention will be described in detail with reference to the drawings.

FIRST EXAMPLE

Figure 1:
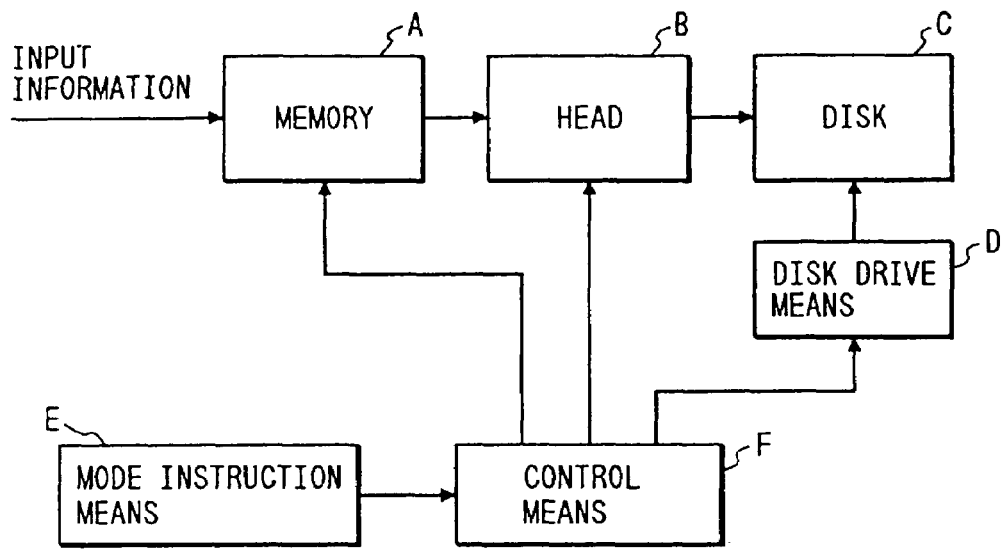
FIG. 1 is a block diagram showing a basic configuration in a first example of the present invention.

FIG. 1 shows a basic configuration in one example of the present invention. In FIG. 1, A is a memory for storing the input information, B is a recording head, C is a disc into which the information is recorded with the head B, and D is disc driving means for driving the disc C. E is mode instructing means for sequentially instructing a first mode of waiting for the recording, and a second mode of executing the recording. F is control means for controlling the operation so as to place only the memory B in a wait state in accordance with a first mode instruction from the mode instructing means E, and then storing the input information into the memory B in accordance with a second mode instruction from the mode instructing means E, and concurrently or afterwards starting the disc driving means D.

The above input information is an information signal supplied from image pickup means or a host apparatus, for example.

In the following, an example in which the present invention is applied to an electronic still camera will be described.

Figure 2:
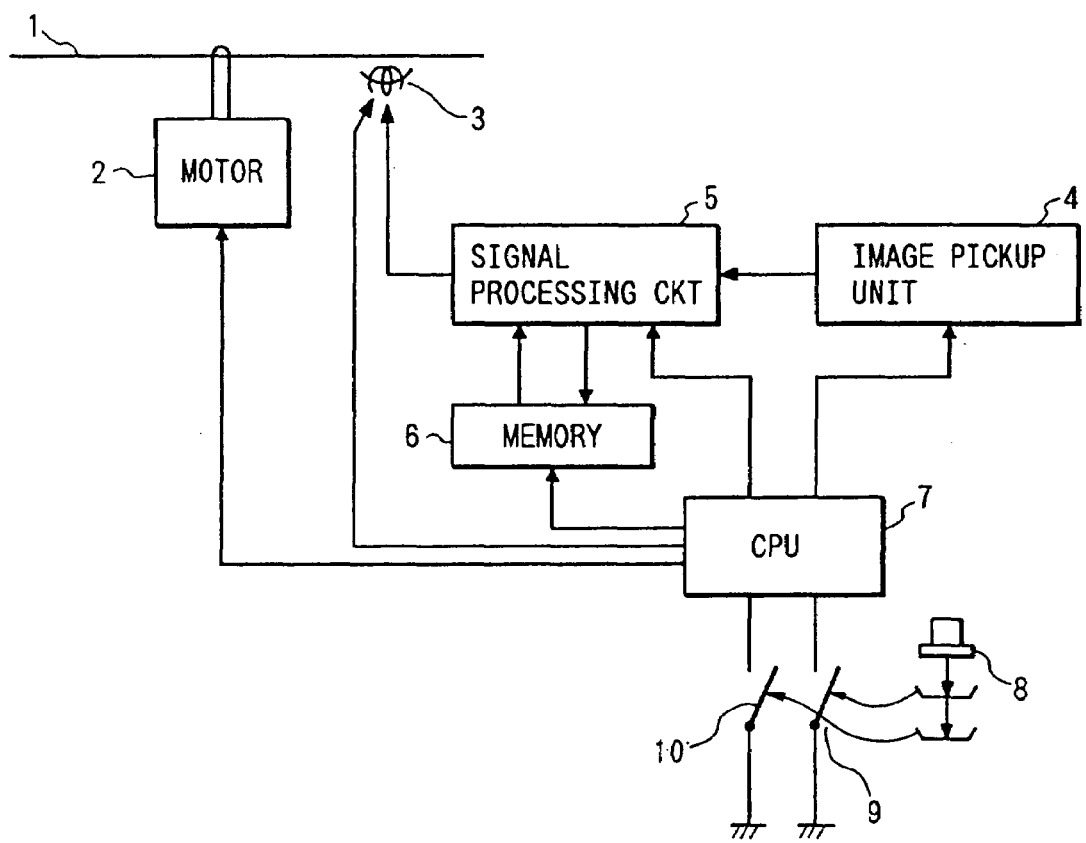
FIG. 2 is a block diagram showing a circuit configuration of an apparatus in one example of the present invention.

FIG. 2 shows an electrical configuration of an apparatus in the example of the present invention. In FIG. 2, 1 is a disc, and 2 is a motor for driving the disc 1. 3 is a head for recording an image signal onto the disc 1. 4 is an image pickup unit for picking up an object image, composed of CCD (Charge Coupled Device), for example. The image signal input from the image pickup unit 4 is processed into a signal form suitable for the recording method onto the memory 6 or disc 1 by a signal processing circuit 5.

7 is a CPU (Central Processing Unit) for controlling the entire apparatus, having a program memory internally. 8 is a release switch (thereinafter abbreviated as SW). The release switch SW8 turns on a switch (SW) 9 at the first stroke, and also turns on a switch SW10 while holding the switch SW9 on, at the second stroke.

One example of the operation procedure for this apparatus having the above configuration is shown in FIG. 3. In FIG. 3, if the release switch SW8 is depressed into the first stroke instructing a wait mode for recording, the CPU7 detects the SW9 to be ON (step S1), and then clears the memory 6 (step S2), thereby placing the operation into a recording enabled state.

At this time, if the release SW8 is returned to the OFF position, the CPU7 is placed in an initial state (step S4), but if the release SW8 is further depressed into the second stroke instructing a recording execution mode, the CPU7 detects the SW10 to be ON (step S3), thereby driving the image pickup unit 4 to pick up an image. An image signal picked up from the image pickup unit 4 is stored via the signal processing circuit 5 into the memory 6 (step S5).

Subsequently, the driving motor 2 is started and the head 3 is accessed to an appropriate track position (step S6). And the image signal once stored in the memory 6 is written via the signal processing circuit 5 into the disc 1 by the use of the head 3 (step S7), and the recording is completed (step S8).

As above described, this example has an effect that the consumption power is saved and the temperature elevation within the apparatus can be suppressed by controlling the operation such that only the memory is placed into the wait state in the recording wait mode, and the disc driving means is driven in the recording execution mode.

SECOND EXAMPLE

The second example of the present invention will be described below with reference to the drawings.

Figure 4:
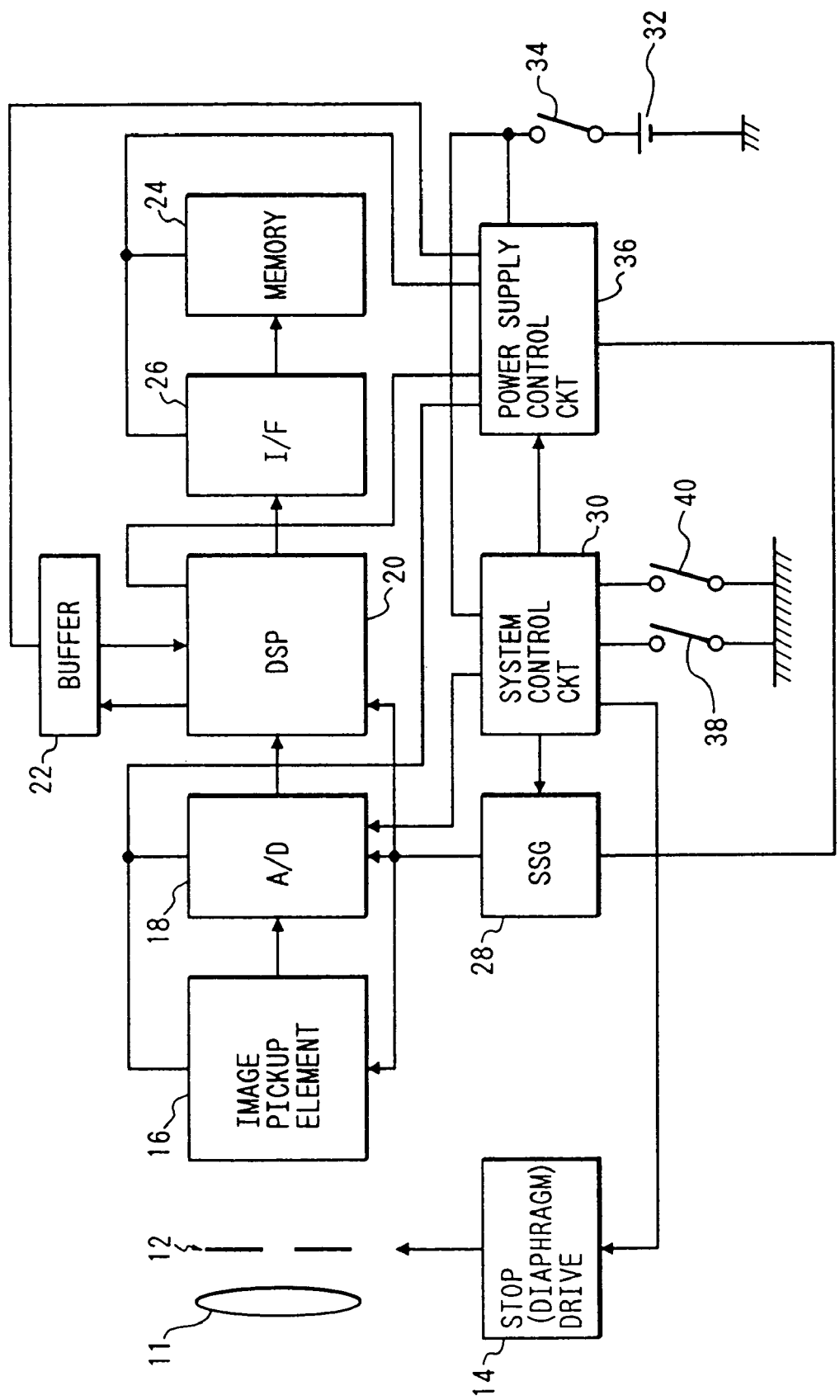
FIG. 4 is a block diagram showing a configuration in a second example of the present invention.

FIG. 4 is a block diagram schematically showing the configuration in one example of the present invention. 11 is a taking lens, 12 is a stop (diaphragm, aperture), 14 is a stop (diaphragm) driving circuit for opening or closing the stop 12, 16 is an image pickup element, 18 is an A/D converter for converting the output of the image pickup element into a digital signal, and 20 is a digital signal processing circuit (DSP) for performing the signal processing such as photometry, colorimetry and compression, using a buffer memory 22 such as a semiconductor memory.

24 is a large memory device for storing a photographed image ultimately, consisting of a magnetic disc driver, an optical disc driver, an optical magnetic disc device and a solid memory device such as EPROM and battery backed up DRAM. The solid memory device is a so-called memory card. 26 is an interface between the output of the DSP20 and the memory device 24.

28 is a synchronizing signal generating circuit (SSG) for supplying a clock or synchronizing signal necessary for each of the image pickup element 16, the A/D converter and the DSP20, 30 is a system control circuit for controlling the whole apparatus, 32 is a power supply battery, 34 is a power supply switch, and 36 is a power supply control circuit for controlling the power supply to each of the circuits 14 to 28 under the control of the system control circuit 30.

38 is a switch for closing at the first stroke with a depression of the shutter release button, and 40 is a switch for closing at the second stroke with a further depression of the shutter release button. Ordinarily, the system control circuit 30 starts the preparation (photometry, colorimetry) for photographing in accordance with the closing of the switch 38, and performs the photograph (i.e., exposure of the image pickup element 16 and read out therefrom) in accordance with the closing of the switch 40.

The operation as shown in FIG. 4 will be described with reference to FIGS. 2, 3 and 4.

If the power supply switch 34 is turned on, the power is fed to the system control circuit 30 to start the operation. Then the internal circuit is first initialized (S1), the condition for external interruption with the closing of the switch 38 is set up (S2), the external interruption is permitted (S3), so that the operation is placed in a wait state (sleep mode). The sleep mode is a low consumption power mode in which the contents of registers within the system control circuit 30 are kept, but the counting operation of counter or the program operation is stopped. Accordingly, in this sleep mode, even if the power supply switch 34 is closed, the battery 32 is not substantially used.

Figure 6:
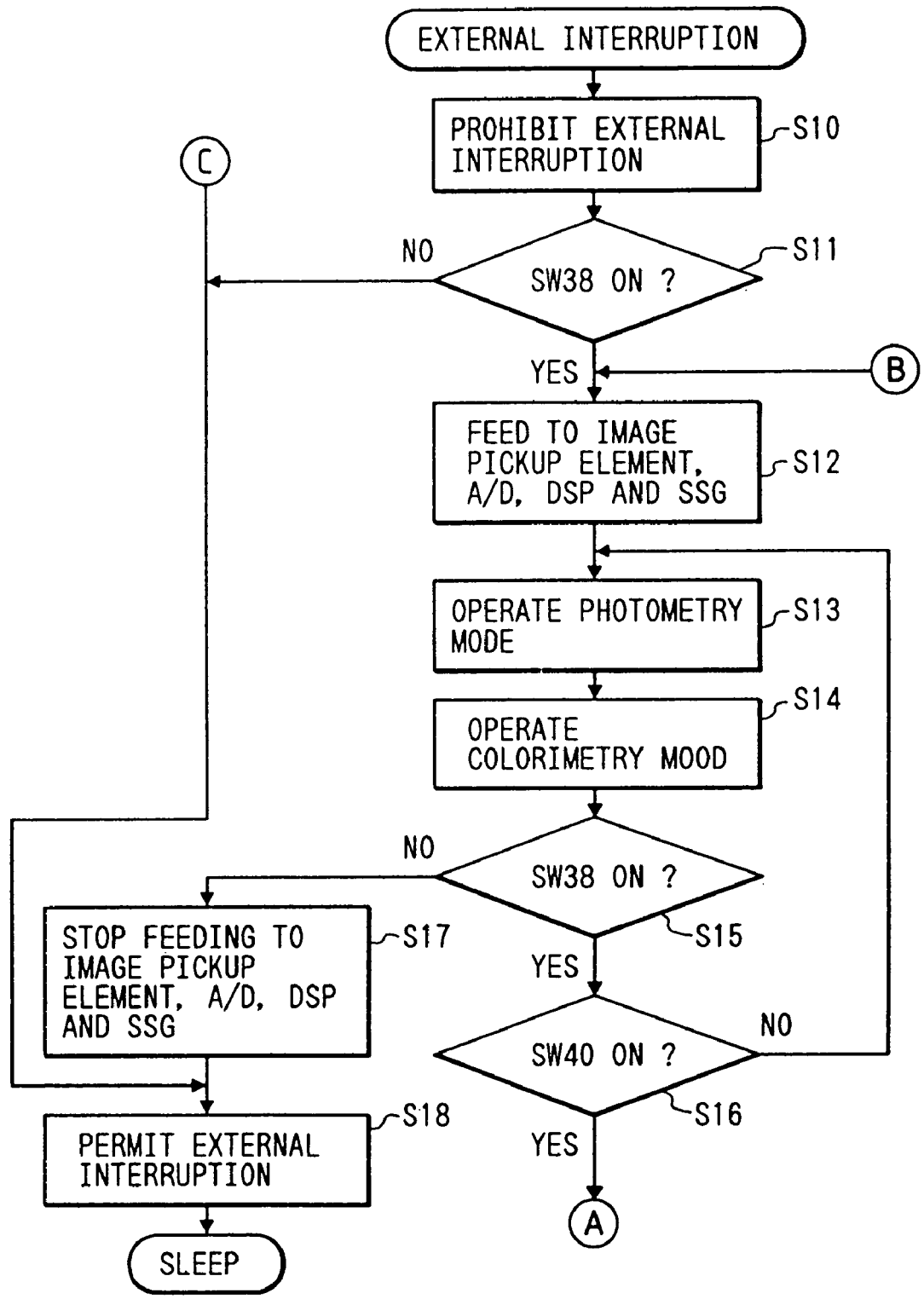
FIG. 6 is a part of a flowchart for the photographing operation in the example of FIG. 4.

If the switch 38 is first turned on with a depression of the shutter release button, the system control circuit 30 starts a program as shown in FIG. 6 with an external interruption. That is, the external interruption is first prohibited (S10) to check for the switch 38 (S11). If the switch 38 is off (S11), the external interruption is permitted (S18) to place the operation into the sleep mode, while if the switch 38 is on (S11), the power supply control circuit 36 feeds the power to the image pickup element 16, the A/D converter 18, the DSP 20 and the synchronizing signal generating circuit 28 (S12), which are operated in the photometry mode (S13) and then in the colorimetry mode (S14).

In the photometry mode, for example, the stop 12 is fully opened, the image pickup element 16 is exposed for a predetennined time, and then a photoelectrically converted signal is read out. The A/D converter 18 converts the output of the image pickup element 16 into the digital form, and the DSP 18 calculates the luminance of an object with the weighting and integration. In the colorimetry mode, the color temperature of the light illuminating the object is estimated from the luminance of the object calculated in the photometry mode. Based on an estimated color temperature, the white balance is adjusted.

Until the switch 40 is turned on (S16), the photometry (S13) and the colorimetry (S14) are repeated; while if the switch 38 is turned off (S38), the power supply control circuit 36 stops feeding the power to the image pickup element 16, the A/D converter 18, the DSP20 and the synchronizing signal generating circuit 28 (S17), and the external interruption is permitted (S18), so that the operation is placed in the sleep mode.

If the switch 40 is turned on at the second stroke of the shutter release (S16), the stop 12 is controlled (S19) by means of the stop driving circuit 14 in accordance with the luminance of an object calculated in the photometry mode (S13), the power is fed to the buffer memory 22 (S20), and the image pickup element 16 is exposed for a predetermined time after removing unnecessary charges (S21). With the exposure of the image pickup element 16, a charge signal is read out, converted into the digital signal with the A/D converter 18, and applied to the DSP20 (S22).

The DSP20 makes the gamma and knee corrections to adjust the white balance in accordance with the color temperature in the colorimetry mode, compresses the digital signal with a predetermined compression method, and writes the processed digital data into the buffer memory 22. Note that the contents of buffer memory 22 should be cleared before writing of the buffer memory 22. This is because with the compression of a variable-length coding method, previously photographed image data may remain in the buffer memory 22, or random initial data may be stored therein when the power is turned on. Accordingly, clearing of the memory allows proper data to be stored.

Then, the power control circuit 36 stops feeding the power to the image pickup element 16 and the A/D converter 18 (S23), and feeds the power to the interface 26 and the memory device 24 (S24). The data stored in the buffer memory 22 is read out, and transferred via the DSP20 and the interface 26 in the memory device 24 to record the data (S25). After recording into the memory device 24, it stops feeding the power to the interface 26 and the memory device 24 (S25), and to the buffer memory 22 and the synchronizing signal generating circuit 28 (S27).

If the switch 40 is turned off (S28), the switch 38 is checked (S29), in which if it is off, the external interruption is permitted, so that the operation is placed in the sleep state (S18), while if it is on, the photometry and the colorimetry following the step S12 are continued. At steps S28 and S29, one frame of image is recorded into the memory device 24 with one release operation, but in a half-depressed state of the release button, the photometry and the colorimetry are continued.

As will be understood from the above description, the memory device 24 of this example uses an electric power of the battery 32 in the operation for recording the image information, while it does not use the battery 32 to hold the recorded information.

In the above example, the compressed information is stored in the buffer memory 22, so that the storage capacity necessary for the buffer memory 22 can be reduced. On the other hand, it will be appreciated that the image information with the gamma and knee corrections applied and the white balance adjusted is stored in the buffer memory 22, and the DSP20 may compress them with a predetermined compression method prior to the transfer to the buffer memory 22 or from the buffer memory 22 to the memory device 24.

Figure 8:
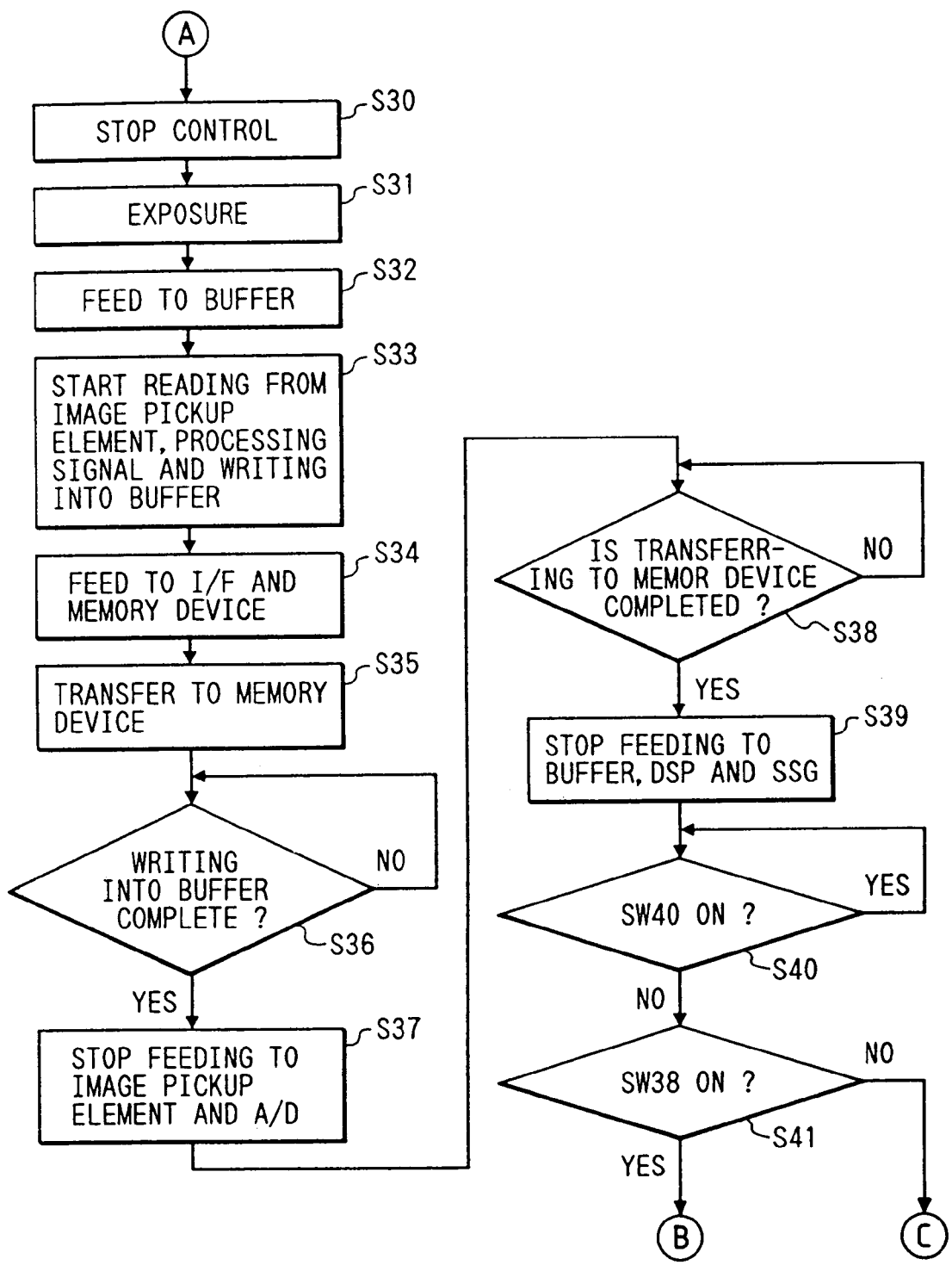
FIG. 8 is a modified flowchart.

The operation after turning on the switch 40 can be changed as shown in the flowchart of FIG. 5. Referring now to FIG. 8, if the switch 40 is turned on (S16), the stop is controlled (S30) via the stop driving circuit 14 in accordance with the luminance of an object calculated in the photometry mode (S13), and after removing unnecessary charges from the image pickup element 16, the exposure is started (S31). The power is fed to the buffer memory 22, taking into consideration the set up of the power supply voltage to the buffer memory 22, so that the buffer memory 22 may be placed in a normal operating state at the completion of the exposure (S32).

In this way, if the power is fed to the buffer memory 22 so that the buffer memory 22 may be in the normal operating state at the completion of the exposure of the image pickup element 16, the feed time to the buffer memory 22 can be minimized.

After the completion of the exposure for a predetermined period, a charge signal with the exposure of the image pickup element 16 is read out, and written into the buffer memory 22 via the A/D converter 18 and the DSP20 (S33). The DSP20 makes the gamma and knee corrections, adjusts the white balance in accordance with the color temperature in the colorimetry mode, compresses the data with a predetermined compression method, and writes the processed digital data into the buffer memory 22. Note that the contents of the buffer memory 22 should be cleared before writing into the buffer memory 22, as in FIG. 4.

The power is fed to the interface 26 and the memory device 24 upon writing into the buffer memory 22 (S34), and the data is transferred from the buffer memory 22 to the memory device 24 (S35). That is, the data stored in the buffer memory 22 is sequentially read out, transferred via the DSP20 and the interface 26 to the memory device 24, and recorded (S35).

If the writing into the buffer memory 22 has been completed (S36), the feed to the image pickup element 16 and the A/D converter 18 is stopped (S37), and if the transfer of data has been completed from the buffer memory 22 to the memory device 24 (S38), the feed to the DSP20, the buffer memory 22 and the synchronizing signal generating circuit 28 is stopped (S39).

Figure 7:
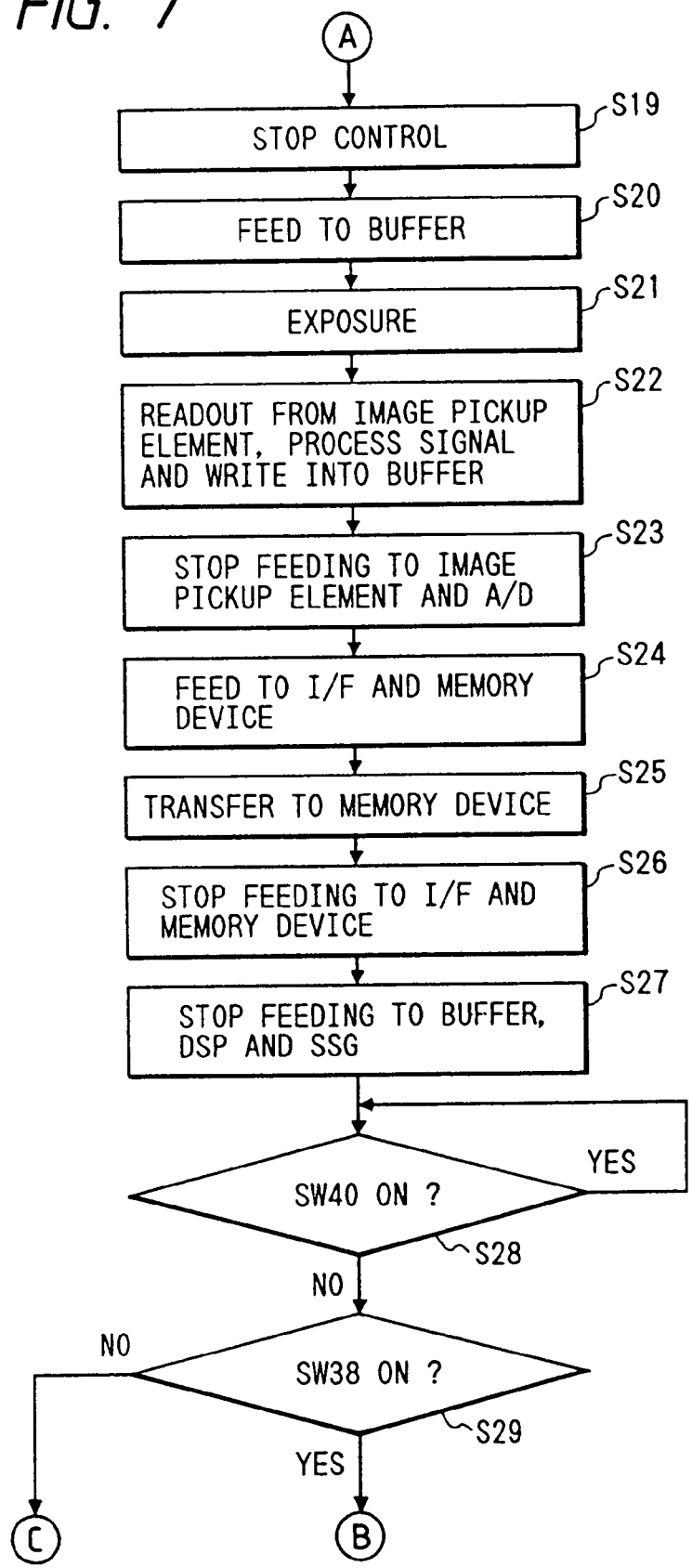
FIG. 7 is a part of a flowchart for the photographing operation in the example of FIG. 4.

Thereinafter, as in steps S28 and S29 of FIG. 7, if the switch is turned off (S40), the switch is checked (S41), in which if the switch 38 is off, the external interruption is permitted, so that the operation is placed in the sleep state (S18), while if it is on, the photometry and the colorimetry following step S12 are continued.

To perform the operation as shown in FIG. 8, it is necessary to make the writing into and reading from the buffer memory 22 simultaneously. Therefore, for the buffer memory 22, a dual port RAM should be used, for example. Also, the DSP22 must have a circuit configuration in which the write processing into the buffer memory 22 and the transfer processing of data read from the buffer memory 22 to the memory device 24 are performed at the same time. Of course, when the image is compressed for the transfer from the buffer memory 22 to the memory device 24, the data read out from the buffer memory 22 is compressed and transferred to the memory device 24.

Usually, the memory device 24 is slower in the access speed, the time taken for recording one frame of image to the memory device 24 can be shortened by simultaneously performing the writing into the buffer memory 22 and the transfer from the buffer memory 22 to the memory device 24.

Figure 9:
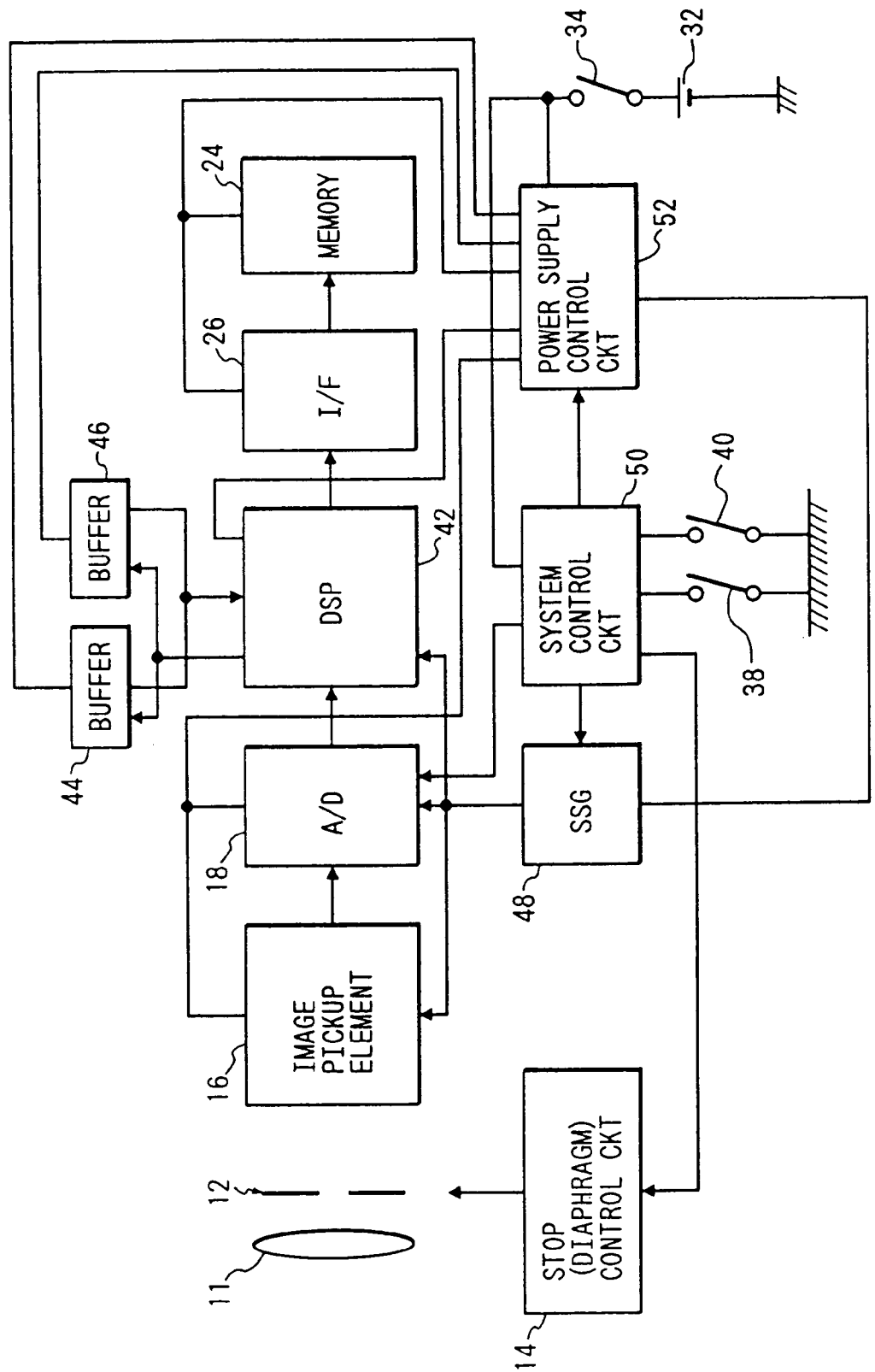
FIG. 9 is a block diagram showing another configuration in the second example.

FIG. 9 is a block diagram of a configuration in another example of the present invention with the continuous photographing speed increased. The like reference numerals are attached to the like components as in FIGS. 1 and 9. 42 is a DSP for performing the digital signal processing such as the photometry, the colorimetry, the gamma correction, the knee correction, the white balance adjustment, the compression, etc. by accessing the buffer memories 44, 46, like the DSP20. The DSP42 is configured such that the writing of data into the buffer memories 44, 46 and the processing for data read from the buffer memories 44, 46 and transferred to the memory device 24 can be performed at the same time.

Note that in this example, each of the buffer memories 44, 46 use a memory element which has a faster writing speed than that into the memory device 24.

48 is a synchronizing signal generating circuit for supplying a clock and synchronizing signal necessary for the A/D converter 18 and the DSP42, 50 is a system control circuit for controlling the whole apparatus, and 52 is a power supply control circuit for controlling the feed to each section of the circuit under the control of the system control circuit 50.

Figure 10B:
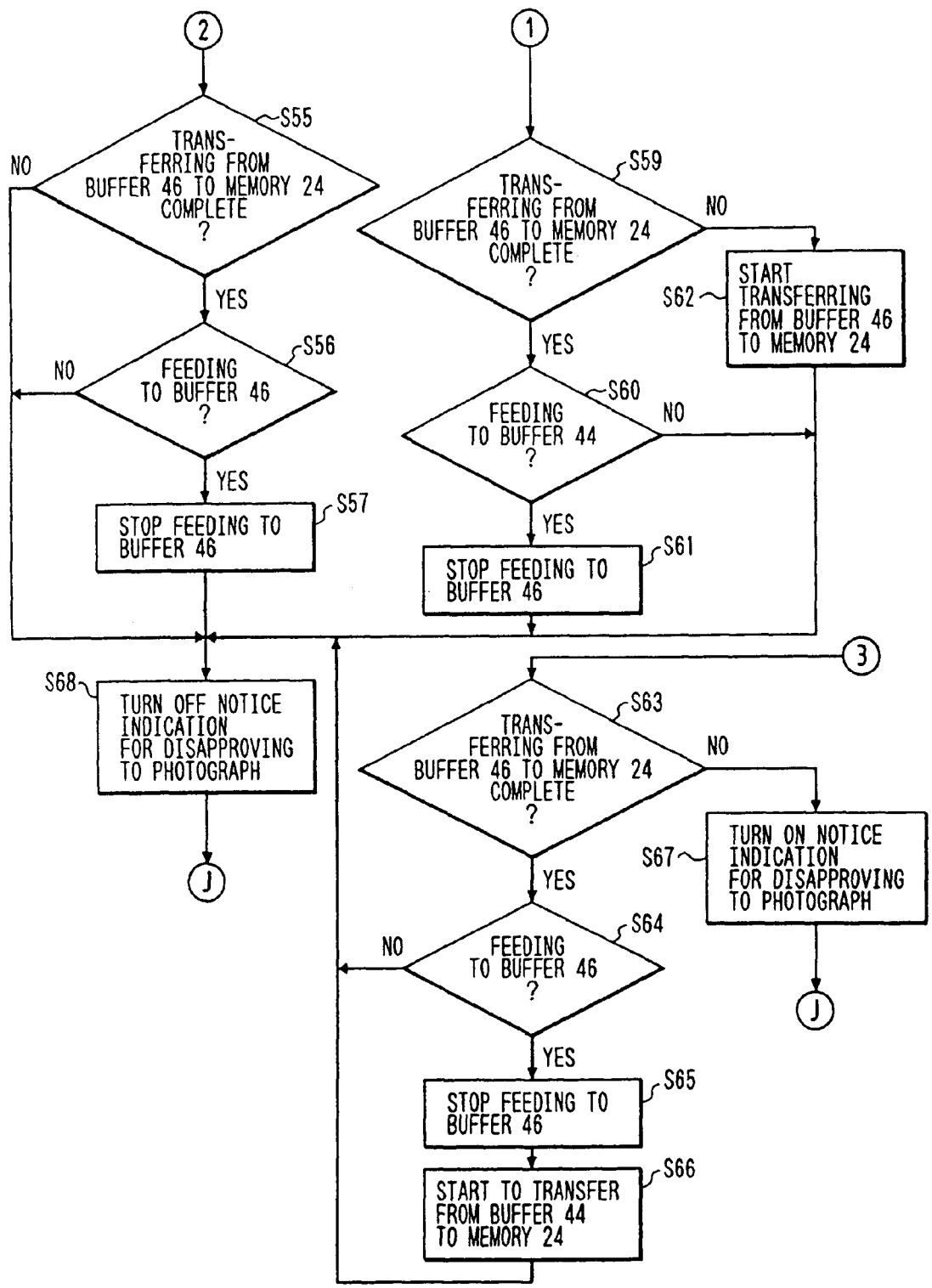
FIG. 10 is a part of a flowchart for the photographing operation in the example of FIG. 9.
Figure 11:
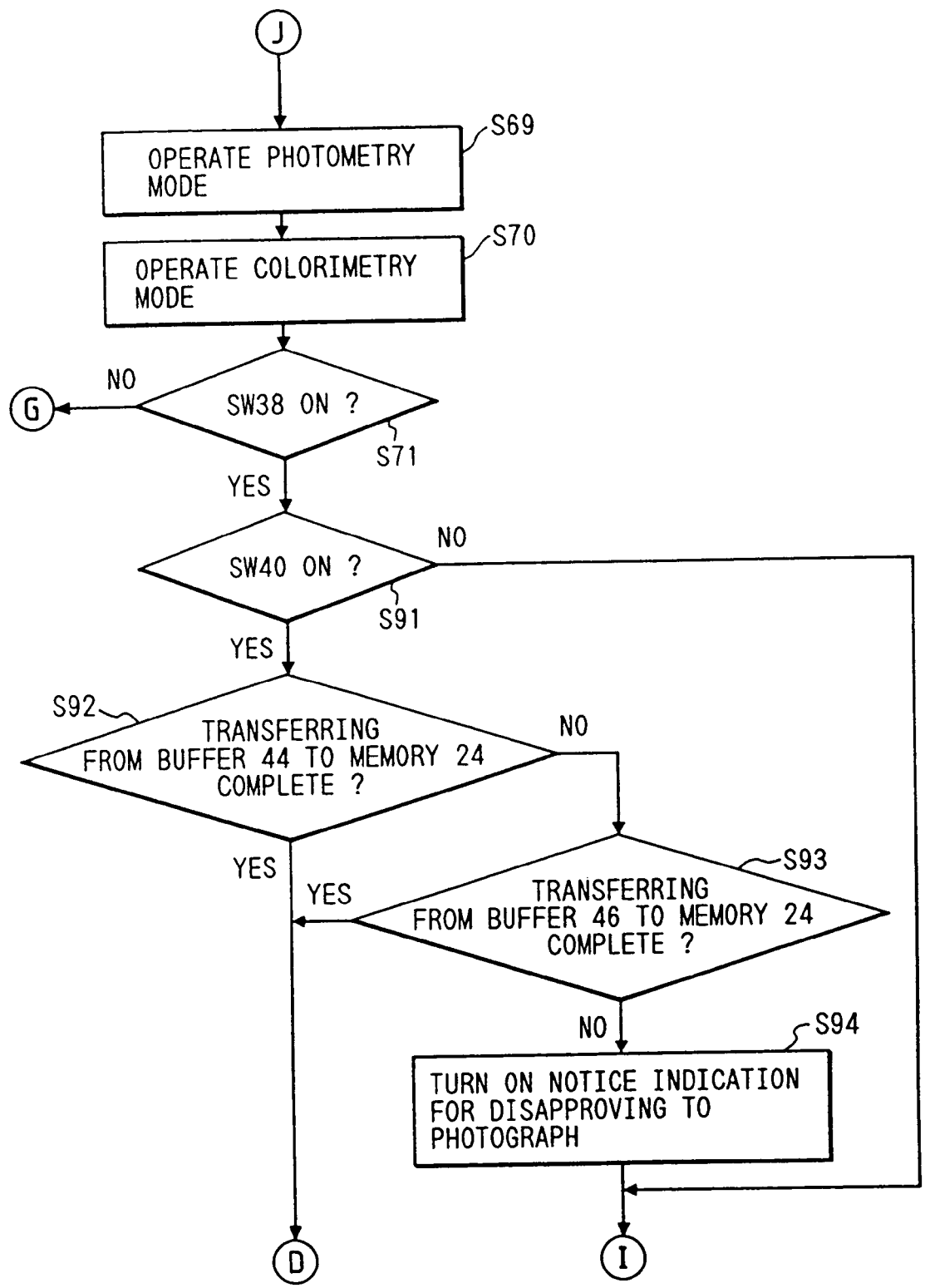
FIG. 11 is a part of a flowchart for the photographing operation in the example of FIG. 9.

Referring now to the flowcharts as shown in FIG. 10 and the following, the operation of the example as shown in FIG. 9 will be described below. Since the routine of closing the power supply switch 34, and causing the system control circuit 50 to initialize the system and permit the external interruption is the same as in FIG. 5, the drawings are omitted.

Figure 12B:
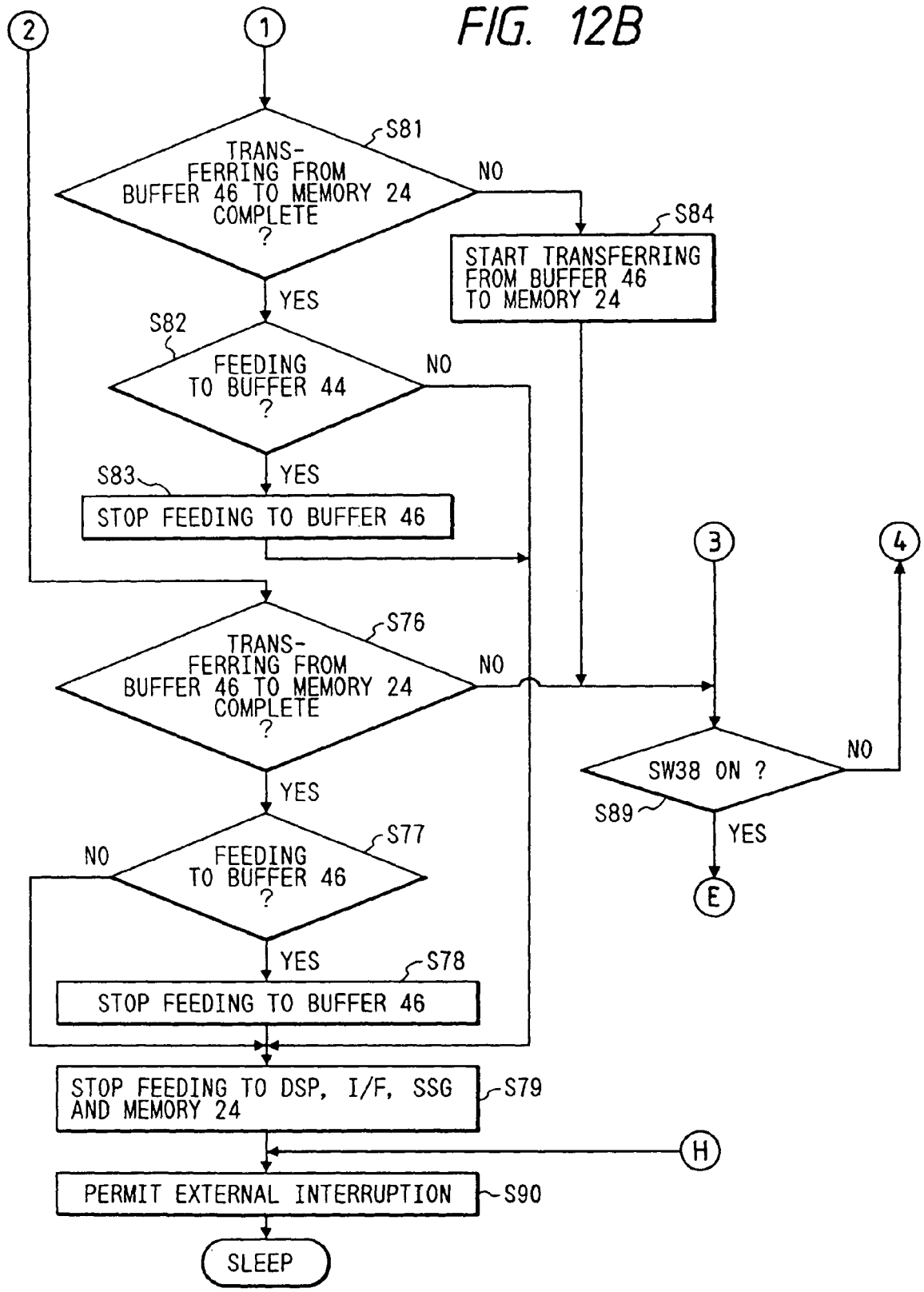
FIG. 12 is a part of a flowchart for the photographing operation in the example of FIG. 9.

If an external interruption occurs upon turning on the switch 38, the system control circuit 50 starts the program as shown in FIG. 10 and the following. That is, first, the external interruption is prohibited (S50), and the switch 38 is checked (S51). If the switch 38 is off (S51), the flow proceeds to FIG. 12 as thereinafter described, where the external interruption is permitted (S90), so that the operation is placed in the sleep mode. If the switch 38 is on (S51), the power supply control circuit 52 feeds the power to the image pickup element 16, the A/D converter 18, the DSP42 and the synchronizing signal generating circuit 48 (S52).

After the power is fed to the image pickup element 16, etc., the transfer of previously photographed image information stored to the memory device 24 is performed (S53 to S68). This routine is used in the continuous photographing mode, for example, and the details will be described later.

After processing of stored data in the buffer memories 44 and 46, the system control circuit 50 operates the image pickup element 16, the A/D converter 18, the DSP42 and the synchronizing signal generating circuit 48 in the photometry mode (S69), and then in the colorimetry mode (S70). As in FIG. 1, the DSP42 calculates the luminance of an object with the integration and an appropriate weighting in the photometry mode, and estimates the color temperature of the light illuminating the object from the luminance of the object calculated in the photometry mode. Based on the estimated color temperature, the white balance is adjusted.

The processing (S52 to S68) of the buffer memories 44, 46, the photometry (S69) and the colorimetry (S70) are repeated while the switch 38 is on (S71) and until the switch 40 is turned on (S91).

If the switch 40 is not turned on and the switch 38 is turned off (S71), all indications are turned off (S72), and the power supply control circuit 52 stops feeding the power to the image pickup element 16, the A/D converter 18, the DSP42 and the synchronizing signal generating circuit 48 (S73). And as thereinafter described in detail in conjunction with the flow of FIG. 9, the transfer of data stored in the buffer memories 44 and 46 to the memory device 24 is confirmed (S74 to S79, S80 to S89), then the feed to the DSP42, the buffer memories 44 and 46, the interface 26 and the memory device 24 is stopped (S79), and the external interruption is permitted (S90), so that the operation is placed in the sleep mode.

If the switch 40 is turned on at a second stroke of the shutter release (S91), the working conditions of the buffer memories 44 and 46 are checked (S92, S93), in which if both are working, a notice indication for disapproving to photograph is displayed (S94). Then the operation returns to step S52, where if at least one of the buffer memories 44 and 46 is available (S92, S93), the photographing is performed.

That is, the flow proceeds to FIG. 10 in accordance with the luminance of the object calculated in the photometry mode (S13), where the stop 12 is controlled via the stop driving circuit 14 (S95), and the image pickup element 16 is exposed to the light for a predetermined period after removing unnecessary charges (S96). Then a determination is made whether or not the data in the buffer memory 44 has been transferred to the memory device 24 (S97). If the transfer has been completed, the buffer memory can be used, while if the transfer has not been completed, the buffer memory can be used.

Here, assume that both the buffer memories 44 and 46 are available. The power is fed to the buffer memory 44 (S98), a charge signal with the exposure of the image pickup element 16 is read out and applied via the A/D converter 18 and the DSP42 to the buffer memory 44, thereby being written into the buffer memory 44 (S99). The DSP42 performs the gamma and knee corrections, adjusts the white balance in accordance with the color temperature in the colorimetry mode, and compresses the data with a predetermined compression method, if the compression is required.

Then a determination is made whether or not the buffer memory 46 is available (S100), in which if it is available (i.e., the data of the buffer memory 46 has been transferred to the memory device 24) (S100), the feed to the buffer memory 46 is stopped (S101, S102) if the power is being fed to the buffer memory 46, the power is fed to the interface 26 and the memory device 24 (S103), and the transfer of data from the buffer memory 44 to the memory device 24 is started (S104).

If all image data of one screen with the image pickup element 16 has been written into the buffer memory 44 (S105), the feed to the image pickup element 16 and the A/D converter 18 is stopped (S106). As the writing speed into the buffer memories 44 and 46 is faster than into the memory device 24, the transfer from the buffer memory 44 to the memory device 24 is never completed before the completion of the writing into the buffer memory 44.

Next, the flow proceeds to step S107, where a single photographing mode (S) or a continuous photographing mode (C) is determined (S107). In the continuous photographing mode, the operation returns to the photometry and colorimetry routine. On the other hand, in the single photographing mode, the data in the buffer memories 44 and 46 are continuously transferred to the memory device 24, while the switch 40 is being on (S112). That is, if the transfer from the buffer memory 46 to the memory device 24 has been completed (S113), and the power is being fed to the buffer memory 46 (S114), the feed to the buffer memory 46 is stopped (S115), and the transfer from the buffer memory 46 to the memory device 24 is started (S116). If the transfer from the buffer memory 46 to the memory device 24 is not completed (S113), or the feed to the buffer memory 46 is stopped (S114), a determination is made whether or not the transfer from the buffer memory 44 to the memory device 24 has been completed (S117), in which if it has been completed, the feed to the buffer memory 44, the DSP42 and the synchronizing signal generating circuit 48 is stopped (S118).

For example, if the switch 40 is placed in the ON state beyond the time taken to transfer the data of one screen from the buffer memory 44 to the memory device 24, the feed to the buffer memory 44, the DSP42 and the synchronizing signal generating circuit 48 is stopped (S118).

If the switch 40 turned off (S112), the operation returns to the photometry and colorimetry routine as long as the switch 38 is on. If the switch 40 is turned off while the transfer from the buffer memory 44 to the memory device 24 has not been completed, thus causing the return to the photometry and colorimetry routine, the detection of the completion for the transfer from the buffer memory 44 to the memory device 24 and the stop of feed to the buffer memory 44 are performed within the photometry and colorimetry routine. That is, if the switch 38 is on, they are processed at steps S53 to S68, while if the switch 38 is off, they are performed at steps S74 to S89.

Next, after the information of picked up image is written into the buffer memory 44 in the single photographing mode, and before the transfer from the buffer memory 44 to the memory device 24 has been completed, the operation of returning to the photometry and colorimetry routine with the switch 40 turned off and the switch 38 being on will be described below.

First, for the photometry and colorimetry, the power is fed to the image pickup element 16, the A/D converter 18, the DSP42 and the synchronizing signal generating circuit 48 (S52). Then a determination is made whether or not the transfer from the buffer memory 44 to the memory device 24 is completed (S53), and a determination is further made whether or not the transfer from the buffer memory 46 to the memory device 24 is completed (S63). As there is no stored data in the buffer memory 46 here, a determination is subsequently made whether or not the feed to the buffer memory 46 is made (S64). As the buffer memory 46 is empty, a notice indication for disapproving to photograph is turned off (S68), and the photometry (S69) and the colorimetry (S70) are performed. While the switch 38 is on and the switch 40 is off, the above routines are repeated, waiting for the completion of the transfer from the buffer memory 44 to the memory device 24.

The operation in the case where the transfer from the buffer memory 44 to the memory device 24 is completed (S53) before a next instruction of photographing (i.e., turning on the switch 40) will be described below. In this case, a determination is made whether or not the power is being fed to the buffer memory 44 (S54). As the power is being fed, the feed to the buffer memory 44 is stopped (S58). Steps S59 to S62 are the processing for the case where picked up image data not yet transferred to the memory device 24 is stored in the buffer memory 46. Here, since the picked up image data has not been stored in the buffer memory 46, the operation is placed in a state where the transfer to the memory device 24 has been logically completed (S59), and the feed is stopped (S60). The subsequent processing is the same as the initial processing where the switch 38 is turned on.

The case where a next image pickup instruction (for turning on the switch 40) is issued before the completion of the transfer from the buffer memory 44 to the memory device 24 will be described. After the switch 40 is detected to be on (S91), a determination is made whether or not the transfer from the buffer memory 44 to the memory device 24 has been completed (S92), in which naturally the transfer will be determined to be uncompleted, and through a check for the completion of the transfer from the buffer memory 46 to the memory device 24 (S93), the operation proceeds to the image pickup routine at step S95 and the following.

After the stop control (S95) and the exposure (S96), the transfer from the buffer memory 44 to the memory device 24 is checked for the completion (S97), in which the transfer will be determined to be uncompleted, so that the power is fed to the buffer memory (S119), a picked up image signal is read out from the pickup image element 16 to make the gamma correction with the DSP42, and written into the buffer memory 46 (S120).

While a check is made to determine that a picked up image with the image pickup element 16 has been written into the buffer memory 46 (S121), the transfer from the buffer memory 44 to the memory device 24 is checked for the completion (S122), in which if it is completed and the power is being fed (S123), the feed to the buffer memory 44 is stopped (S124), and the transfer from the buffer memory 46 to the memory device 24 is started (S125).

If the writing of photographed image into the buffer memory 46 is completed (S121), the feed to the image pickup element 16 and the A/D converter 18 is stopped (S126), and the continuous photographing in the single photographing mode is prohibited (S127 to S135). The processing at steps S127 to S135 is the same as that at steps S107, S112 to S118, and S136.

Next, the operation in the case where the writing of photographed image into the buffer memory 46 is completed more early than the completion of the transfer from the buffer memory 44 to the memory device 24 will be described below.

Figure 13:
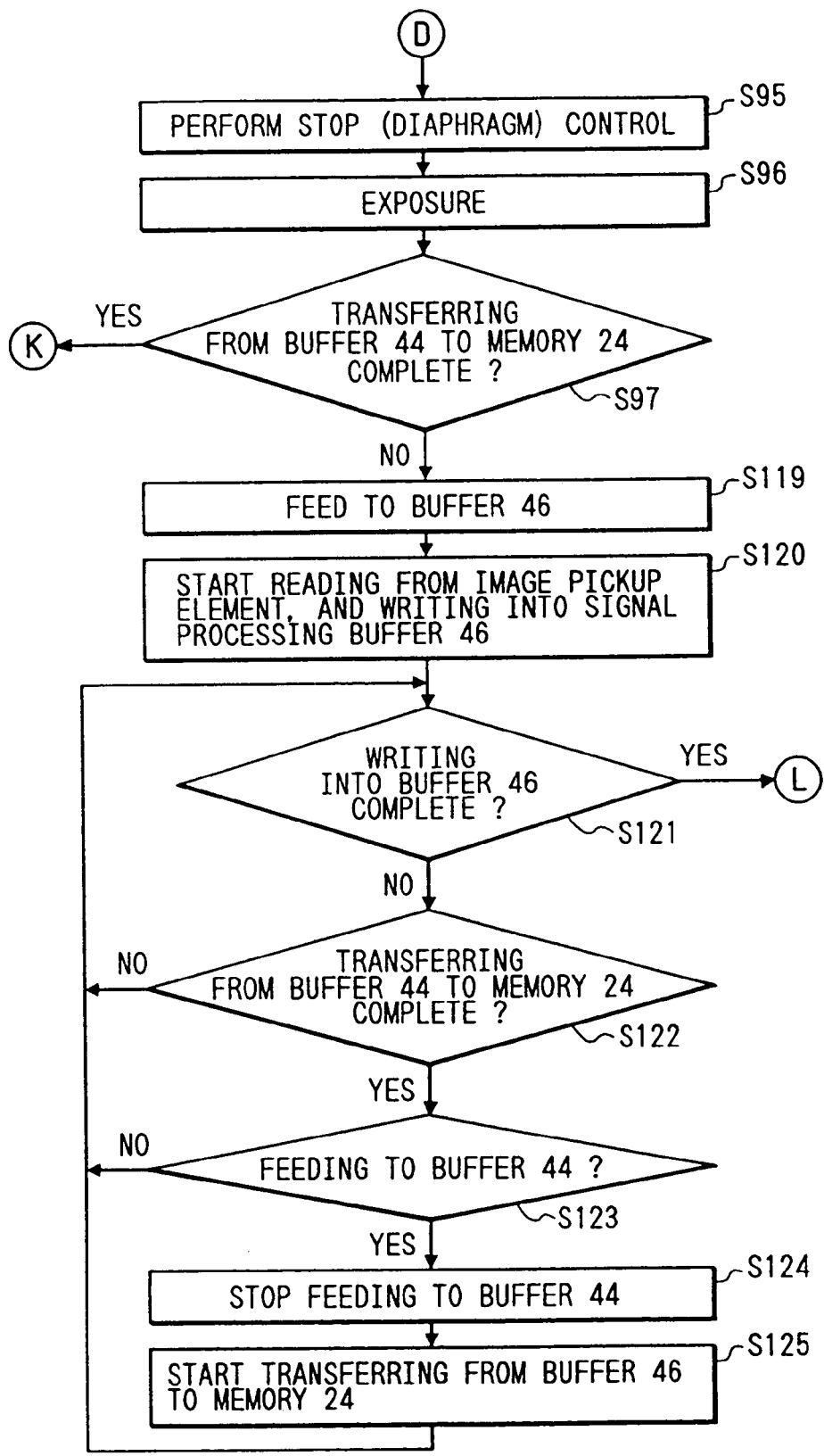
FIG. 13 is a part of a flowchart for the photographing operation in the example of FIG. 9.
Figure 14:
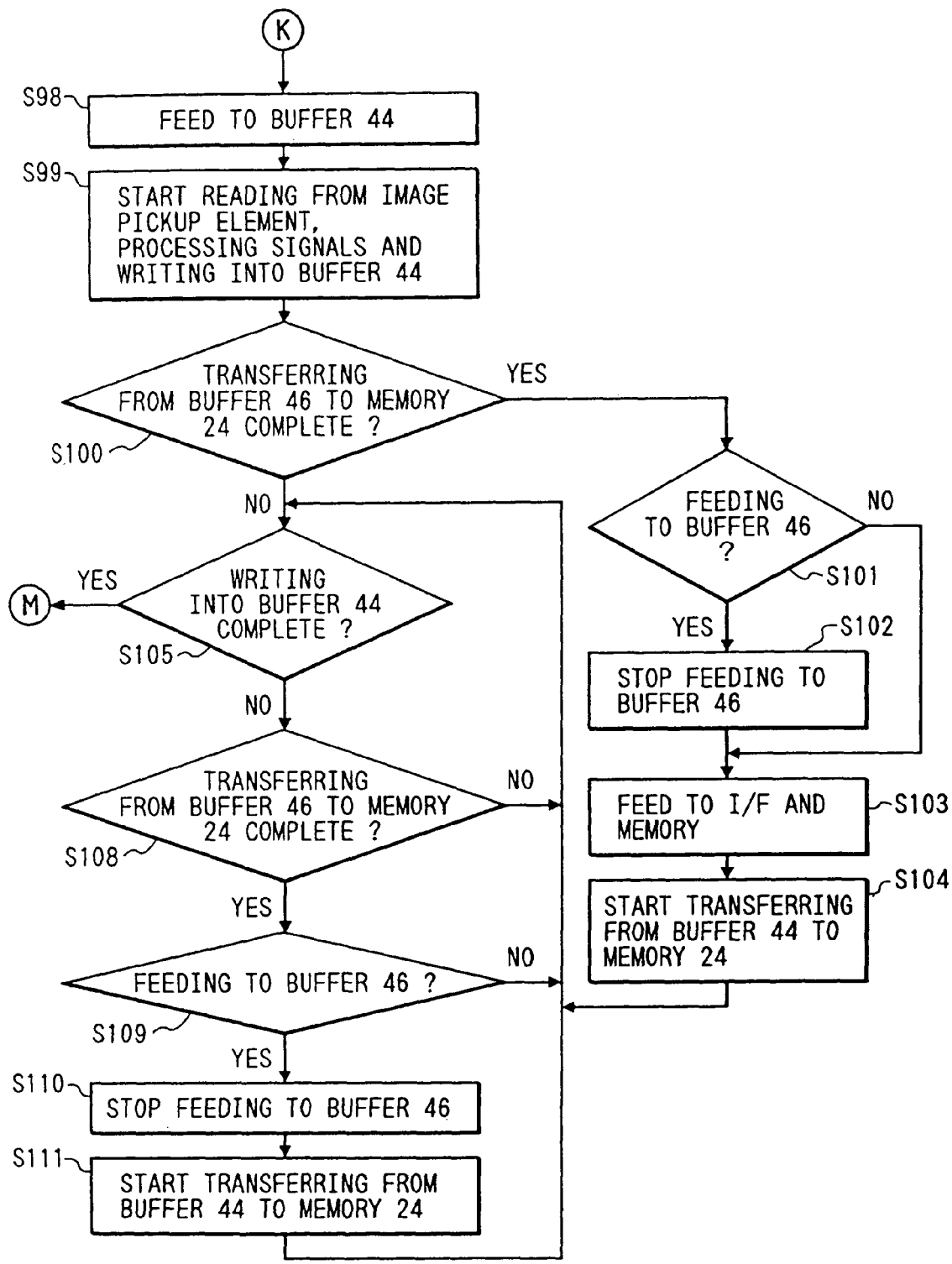
FIG. 14 is a part of a flowchart for the photographing operation in the example of FIG. 9.
Figure 15:
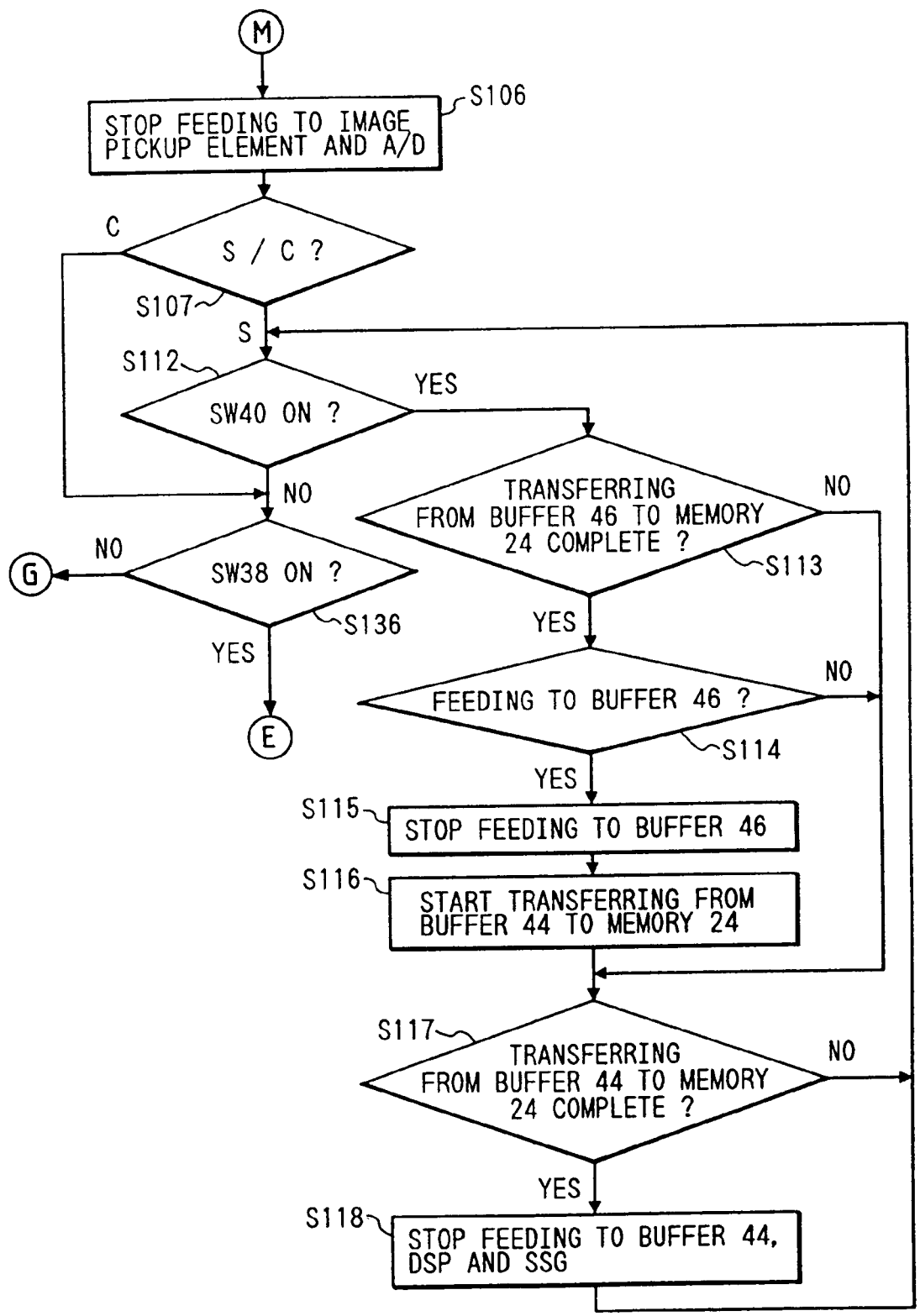
FIG. 15 is a part of a flowchart for the photographing operation in the example of FIG. 9.
Figure 16:
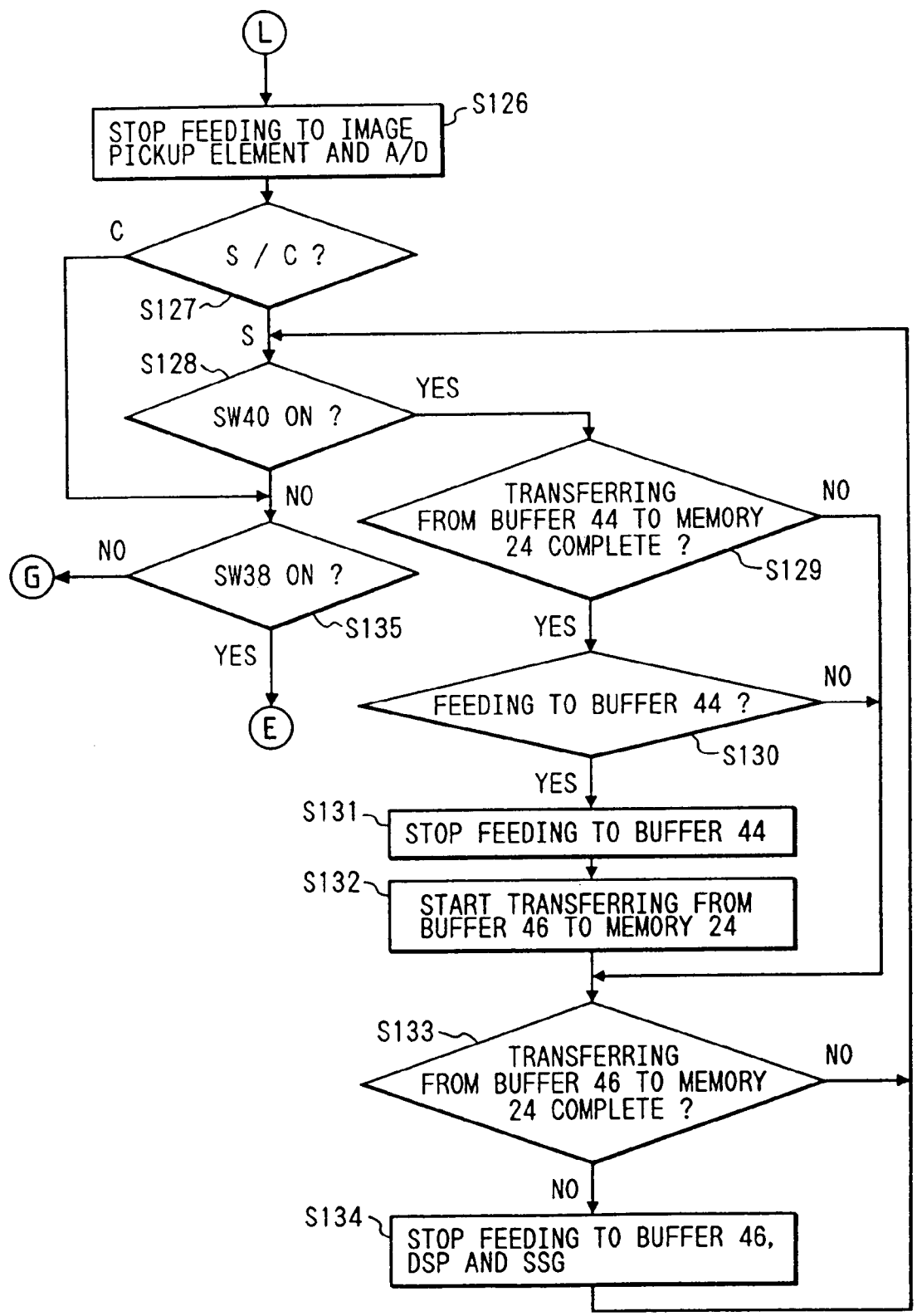
FIG. 16 is a part of a flowchart for the photographing operation in the example of FIG. 9.

In this case, the flow branches from S121 to S126 as shown in FIG. 13.

Upon completion of the writing of photographed image into the buffer memory 46 (S121), the feed to the image pickup element 16 and the A/D converter 18 is stopped (S126), and thereinafter, the transfer from the buffer memory 44 to the memory device 24 is checked for the completion, irrespective of whether the switches 38, 40 are on or off, in which upon completion of the transfer, the feed to the buffer memory 44 is stopped, and the transfer from the buffer memory 46 to the memory device 24 is started, and upon completion of the transfer from buffer memories 44, 46 to the memory device, the feed to the buffer memories 44, 46, the DSP42 and the synchronizing signal generating circuit 48 is stopped.

More specifically, while the switch 40 is being on, the above-mentioned operations at steps S129 to S134 are performed. Thereafter, while the switch 38 is being on even if the switch 40 is turned off (S135), the power is fed to the image pickup element 16, the A/D converter 18, the DSP42 and the synchronizing signal generating circuit 48 (S52) for the photometry and colorimetry, the transfer from the buffer memory 44 to the memory device 24 is checked for the completion (S53), and the transfer from the buffer memory 46 to the memory device 24 is checked for the completion (S63) if the transfer is uncompleted.

According to a premise for describing the operation, the transfer from the buffer memory 44 to the memory device 24 is being performed, and photographed image data is carried in the buffer memory 46. Accordingly, the transfer from the buffer memory 46 to the memory device 24 is uncompleted (S63), and a notice for disapproving to photograph or an indication of the preparation for photographing is displayed (S67). Then, the photometry (S69) and the colorimetry (S70) are performed. Thus while the switch 38 is on and the switch 40 is off, the above routine is repeated, waiting for the completion of the transfer from the buffer memory 44 to the memory device 24.

If the transfer from the buffer memory 44 to the memory device 24 has been completed (S53), the feed to the buffer memory 44 is stopped (S58), and the transfer from the buffer memory 46 to the memory device 24 is started (S62). If the buffer memory 44 is empty, the photographing operation is enabled, and a notice indication for disapproving to photograph is turned off (S68). Thereafter, while the switch 38 is on and the switch 40 is off (S71, S91), the steps S53 to S57 and S68 to S70 are looped, and if the transfer from the buffer memory 46 to the memory device 24 has been completed (S55), the feed to the buffer memory 46 is stopped (S57).

If the switches 38, 40 are both turned off immediately after the transfer from the buffer memory 44 to the memory device 24 has been completed, the feed to the image pickup element 16 and the A/D converter 18 is stopped (S126), and the operation proceeds to step S72 upon the switches 38, 40 being turned off (S128, S135). That is, all indications are turned off (S72), the feed to the image pickup element 16 and the A/D converter 18 is stopped (S73), the data in the buffer memories 44, 46 are transferred to the memory device 24, the feed to the buffer memory to which the transfer has been completed is stopped, and if the both data in the buffer memories 44, 46 have been transferred to the memory device, the feed to the DSP42, the interface 26 and the memory device 24 is stopped (S79), and the external interruption is permitted, so that the operation is placed in the sleep mode (S90).

In the above each example, as the buffer memories 22, 44 and 46, a volatile memory such as SRAM or DRAM was used, but a non-volatile memory can be of course used. With such a memory, the feed to the buffer memories 22, 44, 46 can be restricted only during the time of writing and reading, so that the consumption power can be reduced.

In the example as shown in FIG. 9, when the buffer memories 44, 46 are both carrying the photographed image data, the photographing is prohibited, but it will be also appreciated that a photoelectrically converted signal, i.e., a charge signal, may be held in the image pickup element 16 without reading it out, in accordance with a special operation, and when one of the buffer memories 44, 46 becomes empty, the charge signal may be read out from the image pickup element 16, and written into the empty buffer memory 44 or 46. As the special operation for instructing the exposure of the image pickup element 16 and the hold of the charge signal, for example, a depressing operation in the case in which the release button can be further depressed, or a switch on operation exceeding a predetermined time in the case in which a monitor circuit for the switch 40 on duration is provided can be considered.

If the charge signal of object image is held in the image pickup element 16, the image quality may be degraded owing to dark current or smear, but a desired object image can be recorded onto the memory device 24. In this case, it is possible to reduce the smear by narrowing down the stop 12 at maximum.

To hold the charge signal of object image in the image pickup element 16 serves to resolve a time lag between the release operation and the exposure of the image pickup element 16. It is of course necessary to continue feeding the power to the image pickup element 16 until the charge signal is read out from the image pickup element 16. When the charge signal of object image is held in the image pickup element 16, the retake may be selected by displaying its indication on the display unit.

The transfer from the buffer memories 22, 44, 46 to the memory device 24 is started before the completion of the writing from the image pickup element 16 into the buffer memories 22, 44, 46, but in order to reduce the instantaneous value of the consumed power, it is preferable to start the transfer from the buffer memories 22, 44, 46 to the memory device 24 before the completion of the writing from the image pickup element 16 to the buffer memories 22, 44, 46.

It is to be noted that in the start of feeding the power to each block, a predetermined time necessary for setting up the power supply voltage is included.

In this example, the instantaneous value of the consumed power can be reduced, so that the apparatus using a battery as the power supply can make smaller the decrease in the output voltage owing to the internal resistor of the power supply battery, whereby firstly, the termination voltage (the lower limit of available voltage) of the power supply battery can be lowered, and secondly, the battery with a larger internal resistance (e.g., alkaline manganese battery) can be used.

As will be easily understood from the above description, the instantaneous value of the consumed power can be reduced, so that the drive time can be lengthened even with a battery of small capacity, for example.

THIRD EXAMPLE

The third example of the present invention will be described with reference to FIG. 17 and the followings.

Figure 17:
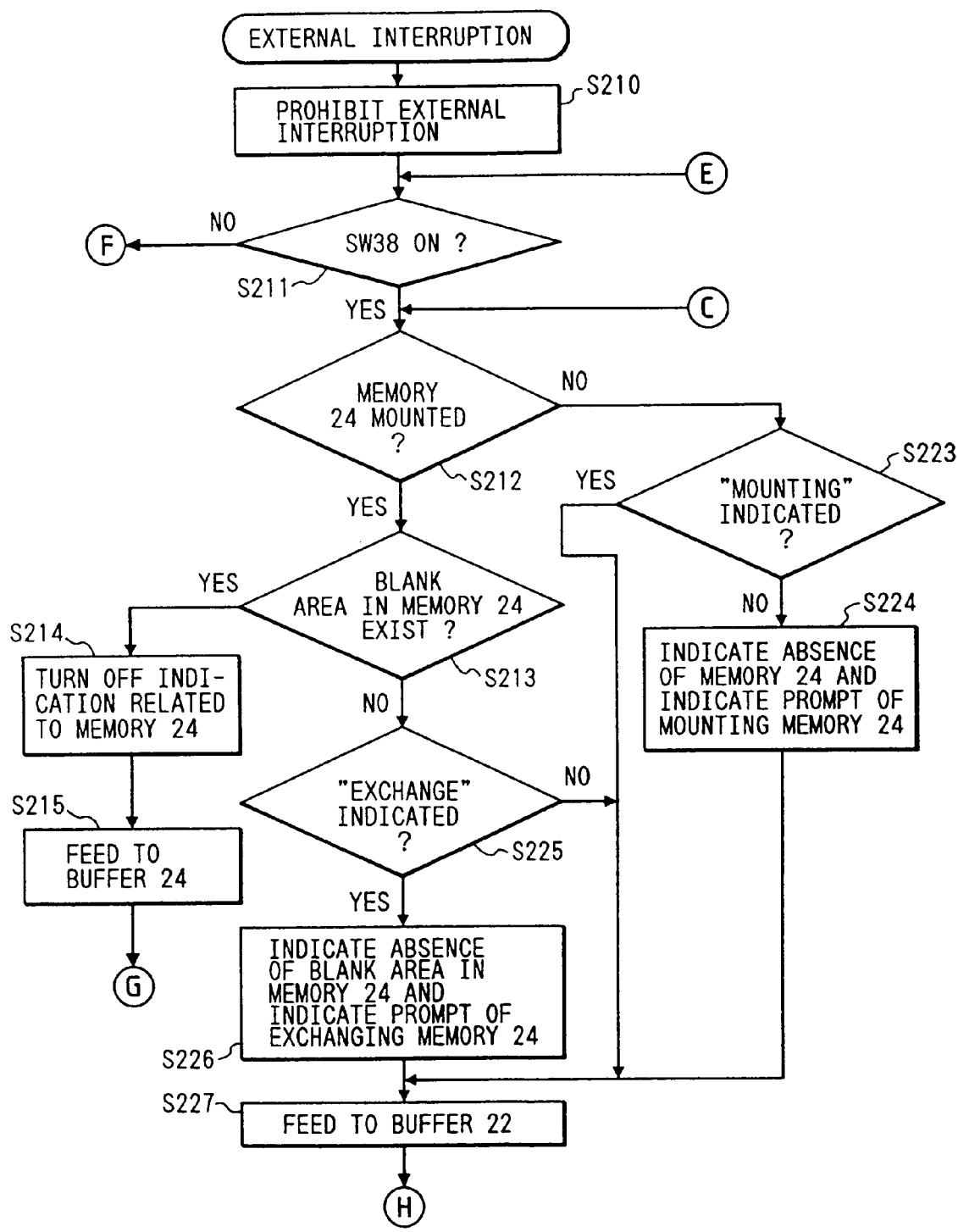
FIG. 17 is a part of a flowchart for the photographing operation in a third example of FIG. 4.

In this example, the configuration of the apparatus is the same as that shown in FIG. 4, but is different in the system control of the apparatus, as shown in the flowcharts of FIG. 17 and the followings.

The operation of FIG. 4 will be described with reference to the flowcharts as shown in FIGS. 17, 18, 19 and 20.

If the switch 38 is first turned on, upon depression of the shutter release button, the system control circuit 30 starts the program as shown in FIG. 17 with an external interruption. That is, first, the external interruption is prohibited (S210), and the switch 38 is checked (S211). If the switch 38 is off (S211), owing to a possible cause of noise, a determination is made whether or not there is any data unsent to the memory device 24 in the buffer memory 22 (S237), in which if there is any unsent data, they are sent to the memory device 24 (S214 to S244, S236), or otherwise (S237), all indications are turned off (S238), the feed to the buffer memory 2 is stopped (S239), and the external interruption is permitted (S240), so that the operation is placed in the sleep mode.

If the switch 38 is on (S211), a determination is made whether or not the memory device 24 is mounted (S212), in which if it is mounted, a determination is further made whether or not it has sufficient empty area to record at least one screen of data (S213). The detection of such empty area can be performed by referencing a directory within the memory of the memory device 24, or may be based on other methods.

First, assume that the memory device 24 has some empty area. Then a notice indication related to the memory device 24 is turned off (S214), and the feed to the buffer memory 22 is performed (S215). A determination is made whether or not the buffer memory 22 has any empty area of at least one screen (S216), in which if it has not empty area, a caution indication for disapproving to photograph is turned on (S218), the feed to the memory device 24 and the interface 26 is performed for the transfer from the buffer memory 22 to the memory device 24 (S233), while if it has any empty area (S216), a caution indication for disapproving to photograph is turned off (S217), and a determination is made whether or not there is any data unsent to the memory device 24 in the buffer memory 22 (S219). If there is no unsent data (S219), the feed to the buffer memory 22 is stopped (S220), and the photometry and colorimetry (S221, S222) are performed. If there is any unsent data (S219), the feed to the memory device 24 and the interface 26 is performed for the transfer from the buffer memory 22 to the memory device 24 (S233), and the photometry and colorimetry (S221, S222) are made.

In the photometry and colorimetry, the power supply control circuit 36 feeds the power to the image pickup element 16, the A/D converter 18, the DSP 20 and the synchronizing signal generating circuit 28, which are then operated in the photometry mode, and in the colorimetry mode. In the photometry mode, for example, the image pickup element 16 is exposed for a predetermined period with the stop 12 fully opened, and a photoelectrically converted signal is read out. The A/D converter 18 converts the output of the image pickup element 16 into the digital form, and the DSP18 calculates the luminance of object with the weighting and integration. In the colorimetry mode, the color temperature of object illuminating light is estimated from the luminance information of object calculated in the photometry mode and the color information of object. The white balance is adjusted based on the estimated color temperature.

The preparation for photographing can be completed with steps S212 to S222, while a check is made to determine whether or not the switch 38 is turned off (S236). If the switch 38 is on (S236), it is confirmed that the buffer memory 22 has some empty area (S249), and the operation waits for the switch 40 to be turned on (S250). The steps S12 and the followings are repeated until the switch 40 is turned on. If there is no empty area in the buffer memory 22 (S249), the operation returns to step S212, and the transfer to the memory device 24 is made at steps S216, S218 and S233. More particularly, at step S249, a determination is first made whether or not the power is being fed, in which if the feed is ceased, the presence of empty area is determined, while if the power is being fed, a check is specifically made to determine whether or not there is any empty area.

If the switch 38 is off (S236), a determination is made whether or not there is any data unsent to the memory device 24 in the buffer memory 22 (S237), in which if there is any data, the data is transferred to the memory device 24 (S241 to S244, S236), while if not (S237), all indications are turned off (S238), the feed to the buffer memory 22 is stopped (S239), and the external interruption is permitted (S240), so that the operation is placed in the sleep mode.

If the switch 40 is turned on (S250), the stop 12 is controlled via the stop drive circuit 14 in accordance with the luminance of object calculated by the photometry (S221), and the image pickup element 16 is exposed (S252). The power is fed to the buffer memory 22 (S253). A charge signal with the exposure of the image pickup element 16 is read out, converted into the digital signal with the A/D converter 18, and written via the DSP20 into the buffer memory 22 (S254). Then the DSP20 makes the gamma and knee corrections, adjusts the white balance in accordance with a color temperature estimated in the colorimetry mode, compresses the data with a predetermined compression method, and writes the processed digital data into the buffer memory 22.

Determinations are made whether or not the memory device 24 is mounted and has any empty area (S255, S257), in which if the memory device 24 is not mounted, an indication of mounting is displayed (S256), and if it has no empty area, an indication of exchange is displayed (S258). If the mounted memory device 24 has any empty area (S257), the power is fed to the memory device 24 and the interface 26, and the data in the buffer memory 22 is transferred via the DSP20 and the interface 26 to the memory device 24 (S259). In this transfer, the data compression may be performed.

After the indication of mounting or exchaging the memory device 24 is displayed (S256, S258), a determination is made whether or not the buffer memory 22 has any empty area (S260), in which if there is no empty area, the operation waits for the memory device 24 to be mounted, while if there is any empty area, the operation waits for the switch 40 to be turned off (S261). While the switch 40 is being on, the processing of steps S255 to S260 is repeated.

The reason why the operation waits for the switch 40 to be turned off is to prevent more than one photograph from being taken with one release operation. Of course, if all data in the buffer memory 22 have been transferred to the memory device 24, the feed to the memory device 24 and the interface 26 is stopped.

Next, the operation in the case where the photographed image information has been recorded onto the last empty area of the mounted memory device 24 so that there is no empty area will be described below.

The transfer of image data in the buffer memory 22 into the last empty area is started (S259), and immediately the switch 40 is turned off (S261). Then the operation returns to step S211.

If the switch 38 is also turned off (S211), a determination is made whether or not there is any data unsent to the memory device 24 in the buffer memory 22 (S237). As the transfer from the buffer memory 22 to the memory device 24 has just started, some unsent data may exist in the buffer memory 22 naturally. The timer (whose function will be described later) is reset (S241), and determinations are made whether or not the memory device is mounted and has any empty area (S242, S243). After that, the feed to the memory device 24 and the interface 26 is made, and the data in the buffer memory 22 is transferred to the memory device (S244).

Note that as the feed to the memory device 24 and the interface 26, and the transfer from the buffer memory 22 to the memory device 24 have been already made at step S259, step S244 is duplicated, but such duplicate control is avoided by means of the software or hardware in the system control circuit 30 or each of the circuits 16 to 26 which are controlled by the system control circuit 30. For example, the flag is set up for each control in the system control circuit 30, and each circuit 16 to 26 is controlled in accordance with a corresponding flag. Besides, during the operation in accordance with a certain control instruction on the side of each circuit 16 to 26, if the same control instruction may be input, the later control instruction is ignored. Other duplicate controls are similarly coped with.

While the switch 38 is being off, the steps S237, S241, S242, S243 and S244 are looped, during which the data in the buffer memory 22 is transferred to the memory device 24. If the transfer is completed (S237), all indications are turned off (S238), the feed to the buffer memory 22 is stopped (S239), and the external interruption is permitted (S240), so that the operation is placed in the steep mode.

In the event that the transfer of data from the buffer memory 22 to the last empty area of the memory device 24 is started, and the switch 40 is held in the on state until the transfer is completed (S259, S261), determinations are repeatedly made to determine whether or not the memory device 24 is mounted and has any empty area (S255, S257). If the empty area in the memory device 24 is filled upon completion of the transfer (S257), an instruction of exchanging the memory device 24 is displayed (S258). A determination is made whether or not the buffer memory 22 has any empty area, in which as the transfer to the memory device 24 has been completed, some empty area naturally exists (S260), and the operation waits for the switch 40 to be turned off (S261). That is, an indication of exchanging the memory device 24 is continuously displayed (S258).

Next, the instance where the memory device 24 having no empty area is mounted or the photograph is taken without exchanging any new memory device 24 will be described below. The former corresponds to a case where the switch 40 is once turned off and then turned on immediately after photographing onto the last empty area, or a case where the switches 38, 40 are turned off without exchange of the memory device 24 after photographing onto the last empty area.

When the switch 38 is turned on newly (S211), and when the switch 38 is held on even if the switch 40 is turned off, determinations are made whether or not the memory device 24 is mounted and has any empty area (S212, S213). If the memory device 24 is not mounted (S212), a notice indication is displayed (S223, S224), and if the mounted memory device 24 has no empty area (S213), a notice indicating that there is no empty area is displayed, and a notice prompting the exchange of the memory device 24 is displayed (S225, S226).

The feed to the buffer memory 22 is made, and if there is no unsent data in the buffer memory 22 (S228), the feed to the buffer memory 22 is stopped (S220), the photometry and colorimetry are made (S221, S222), the switch 38 is checked (S238), the buffer memory 22 is checked for the presence of empty area (S248), and the operation waits for the switch 40 to be turned on (S250). During this time, an indication of mounting or exchanging the memory device 24 is being displayed. If the switch 38 is turned off during this time (S238), the operation is placed in the sleep mode, as previously described at steps S237 to S240. It will be appreciated that if the consumption power for displaying the indication of mounting or exchanging the memory device 24 is sufficiently small, the indication of mounting or exchanging should be continuously displayed.

If the switch 40 is turned on (S250) in the state where the memory device 24 is not mounted or has no empty area, a signal is read out from the image pickup element 16 after controlling the step (S251), exposing the image pickup element 16 (S252) and feeding the power to the buffer memory 22 (S253), and processed for the gamma correction, whereby the data of photographed image is written into the buffer memory 22 (S254). An indication of mounting or exchanging the memory device 24 is displayed (S255, S256, S257, S258), and if there still remains any empty area in the buffer memory 22, the operation waits for the switch 40 to be turned off (S261), while if the buffer memory 22 has no empty area (S261) (for example, when the buffer memory 22 has only a capacity of storing as large as one screen of image data), the operation proceeds to step S229.

Figure 18:
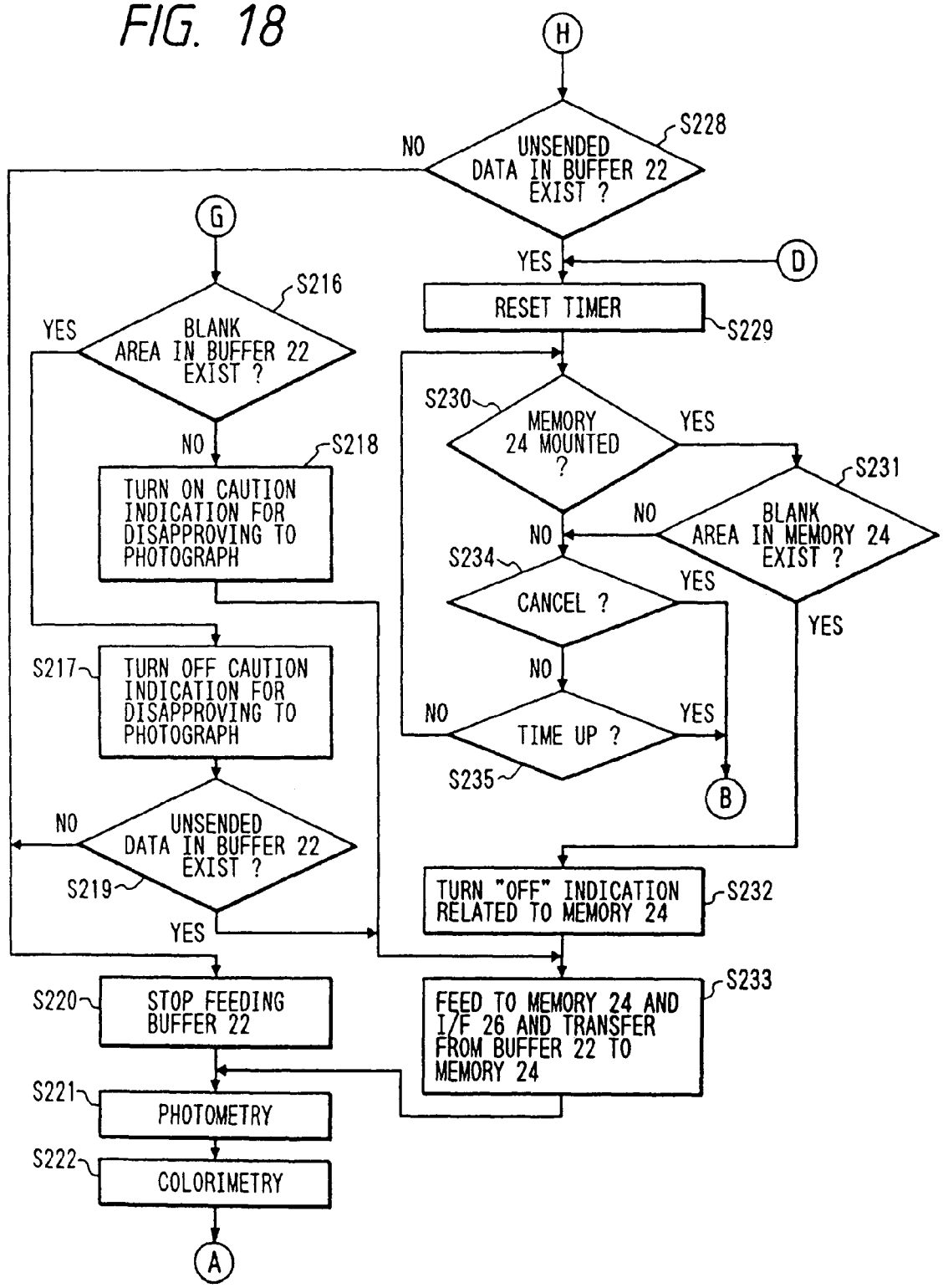
FIG. 18 is a part of a flowchart for the photographing operation in the example of FIG. 4.
Figure 19:
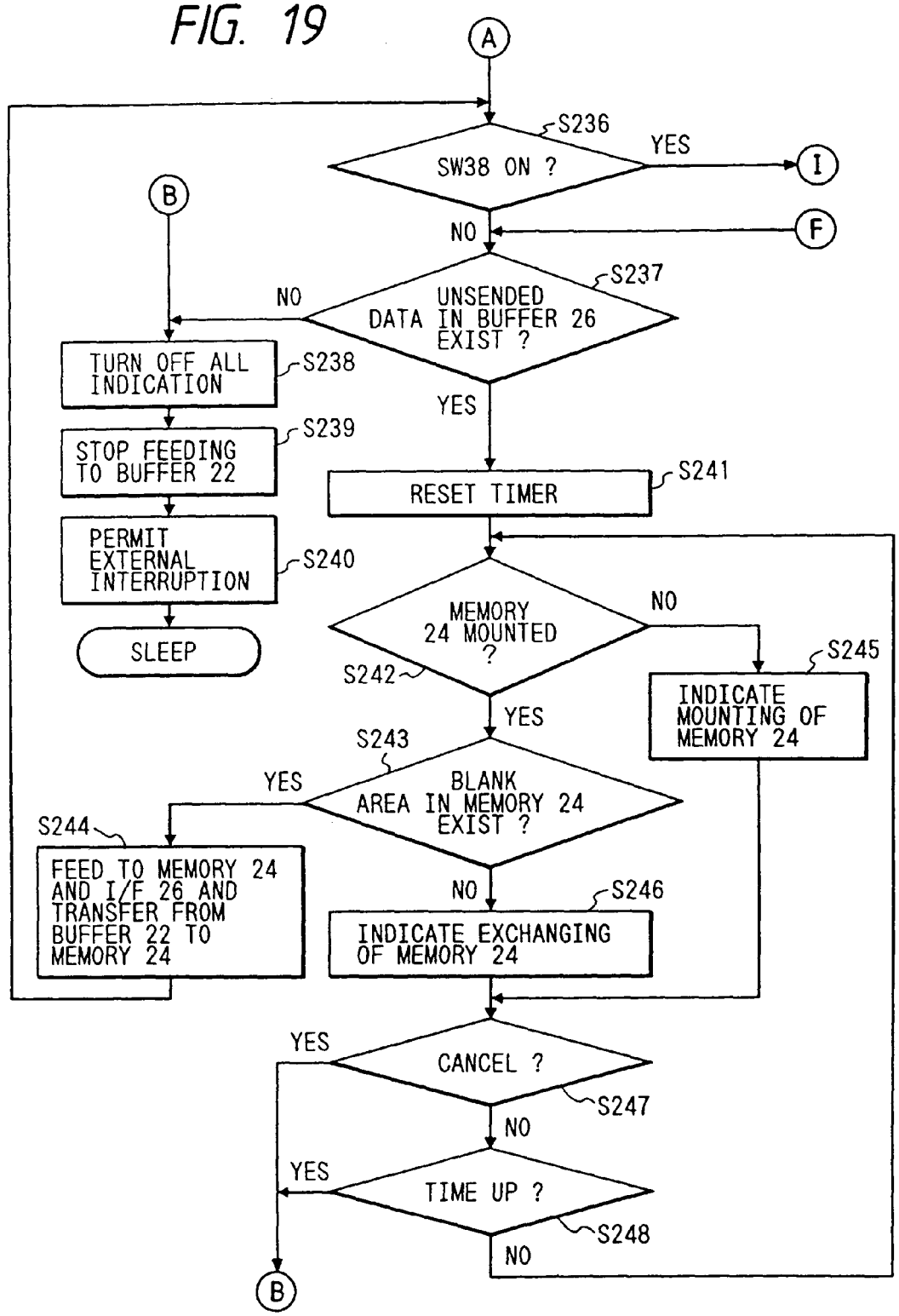
FIG. 19 is a part of a flowchart for the photographing operation in the example of FIG. 4.
Figure 20:
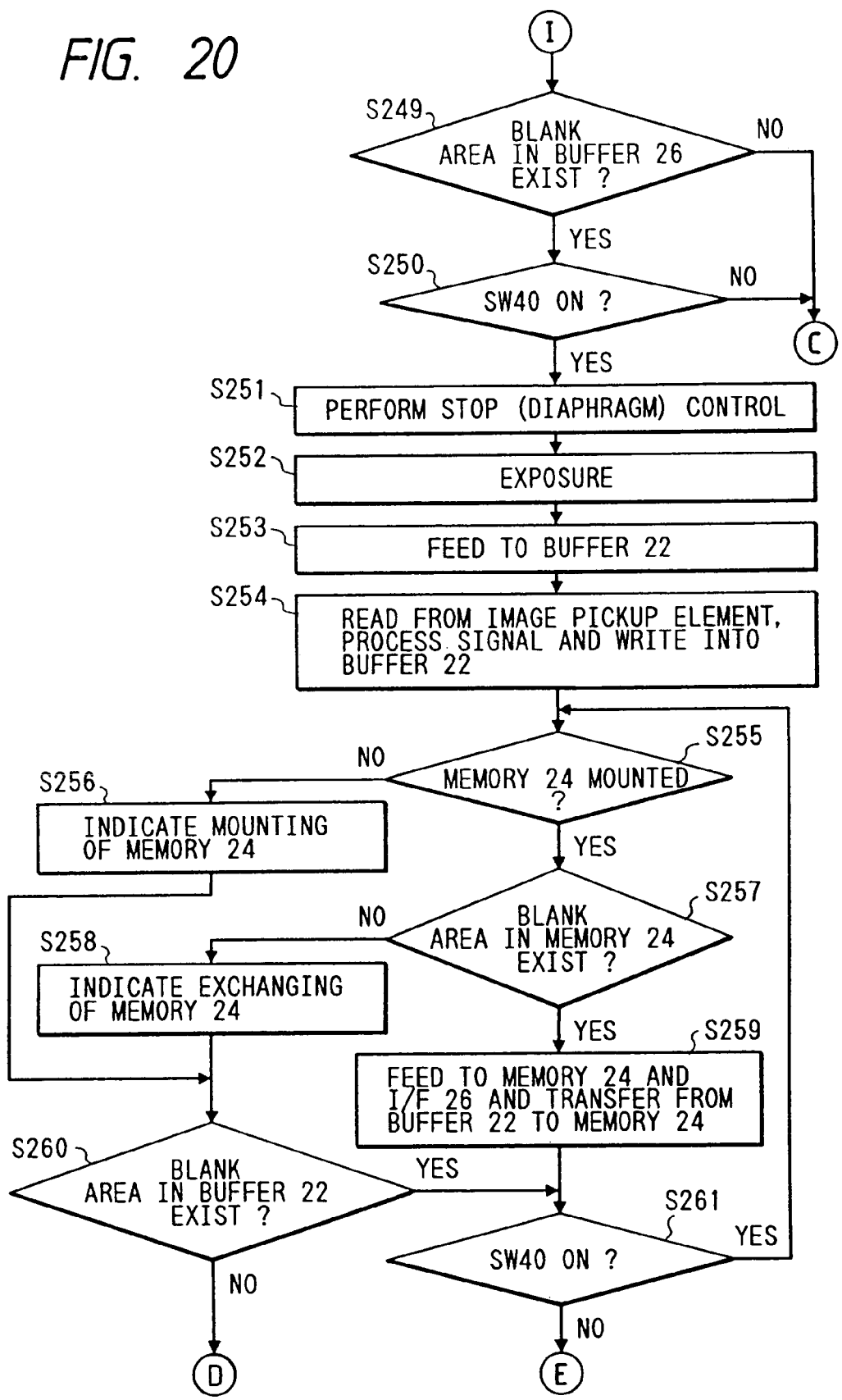
FIG. 20 is a part of a flowchart for the photographing operation in the example of FIG. 4.

Note that in the event that the switch 38 is on (S211), the memory device 24 is not mounted or has no empty area (S212, S213), and unsent data remains in the buffer memory 22 (S228), the operation proceeds to step S229 as shown in FIG. 18.

First, when the memory device 24 is not mounted or has no empty area, the timer for setting the time to hold the data in the buffer memory is reset (S229), and the operation waits for the memory device 24 to be mounted or exchanged (S230, S231), or a cancel switch, not shown, to be operated (S234), until the time is up (S235). If the memory device 24 having some empty area is mounted (S230, S231), the indication related to the memory device 24 is turned off (S232), the feed to the memory device 24 and the interface 26 is performed to transfer the data in the buffer memory 22 to the memory device 24 (S233), and then the preparatory operation for photographing such as the photometry (S221) is entered. Upon operation of the cancel switch, not shown, (S234), or the time up (S235), all indications are turned off (S238), the feed to the buffer memory 22 is stopped (S239), the external interruption is permitted (S240), so that the operation is placed in the sleep mode.

The above-mentioned cancel switch is provided to cancel the release operation when the release operation is falsely made, in the event that the memory device 24 is not mounted or has no empty area. The timer is provided to save the consumption power.

The steps S241 to S243, S245 to S248 are the same as S229 to S231, S234, and S235.

The above-mentioned memory device 24 uses the power of the battery 32 in recording the image information, but may be of the type not using the battery 32 for holding the information to be recorded, for example, a solid memory device such as SRAM or EEPROM backed up by a special-purpose battery, a magnetic disc, a magnetic tape, an optical disc, a laser card or a magneto-optical disc.

It will be appreciated that when the memory device 24 comprises a backup battery for holding the data, the residual capacity of the backup battery is sequentially monitored, whereby if the output is sufficiently decreased so as not to hold the data, an indication of exchanging the memory device 24 may be displayed in the same way as when there is no empty area. Of course, an indication of exchanging or charging the backup battery should be displayed. Under such circumstances, the power for holding the data may be supplied from the battery 32.

The indication of mounting or exchanging the memory device 24 can be made by the voice, rather than the video, or both of them.

While in this example, the time for holding the data in the buffer memory 22 is restricted (S235, S248), it will be appreciated that the holding time may continue as long as the battery 32 lasts, or whether the holding time is limited or not may be selected, or the holding time may be adjusted. Even after the holding operation is started, the serviceability will be raised if the holding time can be changed.

As will be easily understood from the above description, according to this example, the information of photographed image is held in the temporary storage means when recording means is not mounted or has no empty area, whereby there will be less chance of losing the shutter chance.

What is claimed is:

1. A recording apparatus comprising:
   an image pickup, that generates an electrical image signal in response to an object image;
   temporary storage, arranged to receive and to store the electrical image signal;
   a recording unit, arranged to receive image information read out from said temporary storage, and which records and stores that image information;
   a power supply being comprised of a battery and being arranged to supply power to said image pickup, said temporary storage and said recording unit;
   a user-operated switch unit arranged to operate said power supply; and
   a control unit, separate from said switch unit, that controls the power supplied by said power supply in accordance with the operation of said switch unit such that, on operation of said switch unit, said control unit initially causes said power supply to simultaneously supply power to said temporary storage and to stop power to said recording unit, wherein the supply of power to said recording unit is stopped at least until transfer of the electrical image signal is begun to said temporary storage, and then subsequently to cause said power supply to supply power to said recording unit before transfer of said electrical image signal to said temporary storage is complete.

2. An apparatus according to claim 1, wherein said temporary storage comprises a semiconductor memory.

3. An apparatus according to claim 1, wherein said recording unit comprises a dynamic memory recording means.

4. An apparatus according to claim 1, wherein said switch unit is manually operable.

5. An apparatus according to claim 1, wherein said switch unit comprises a pair of switches the second of which can be turned on only after the first has been operated.

6. An apparatus according to claim 1, wherein said power supply is adapted to utilize a battery.

7. An apparatus according to claim 6, wherein said dynamic memory recording means includes a rotary recording medium.

8. An apparatus according to claim 7, wherein said rotary recording medium comprises a disc-shaped medium.

9. An apparatus according to claim 7, wherein rotation of said rotary medium is started when the power is supplied to said recording unit by said control unit.

10. An apparatus according to claim 1, further comprising a data compressor that is arranged to receive image information that is transferred from said temporary storage to said recording unit, said data compressor performing data compression on that image information.

11. An apparatus according to claim 10, wherein the data compression is effected in accordance with a Discrete Cosine Transform algorithm.

12. An apparatus according to claim 1, further comprising a signal processing unit, and wherein some amount of signal processing is performed by the signal processing unit on the electrical image signal before the control unit causes said power supply to supply power to said recording unit.

* * * * *